United States Patent
Yang et al.

(10) Patent No.: US 12,219,370 B2
(45) Date of Patent: Feb. 4, 2025

(54) CHANNEL INFORMATION DETERMINING METHOD, NETWORK DEVICE, AND TERMINAL DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 300 days.

(21) Appl. No.: 17/735,845

(22) Filed: May 3, 2022

(65) Prior Publication Data
US 2022/0264323 A1  Aug. 18, 2022

Related U.S. Application Data

(63) Continuation of application No. PCT/CN2020/126502, filed on Nov. 4, 2020.

(30) Foreign Application Priority Data

Nov. 8, 2019 (CN) .......................... 201911090003.8

(51) Int. Cl.
*H04W 16/28* (2009.01)
*H04L 5/00* (2006.01)
(Continued)

(52) U.S. Cl.
CPC ........... *H04W 16/28* (2013.01); *H04L 5/0051* (2013.01); *H04W 72/044* (2013.01);
(Continued)

(58) Field of Classification Search
CPC ... H04W 16/28; H04W 72/542; H04W 72/21; H04W 72/044; H04L 5/0051
(Continued)

(56) References Cited

U.S. PATENT DOCUMENTS

| 2019/0239212 A1 | 8/2019 | Wang et al. |
| 2019/0297603 A1 | 9/2019 | Guo et al. |

(Continued)

FOREIGN PATENT DOCUMENTS

| EP | 3565172 A1 | 11/2019 |
| JP | 2021512554 A | 5/2021 |

(Continued)

OTHER PUBLICATIONS

3GPP TSG RAN WG4 meeting #92Bis, R4-1911392, to Samsung (Year: 2019).*

(Continued)

*Primary Examiner* — Chi Tang P Cheng
(74) *Attorney, Agent, or Firm* — BROOKS KUSHMAN P.C.

(57) ABSTRACT

A channel information determining method, a network device, and a terminal device are provided. The method includes: updating, activating, or indicating parameter information of a first channel or a first reference signal RS by using a media access control MAC control element CE command, where the parameter information of the first channel or the first reference signal RS is used for determining the parameter information of a second channel or a second RS under a preset condition; and the parameter information includes at least one of transmission configuration indicator TCI state information, spatial relation information, and path loss PL RS.

19 Claims, 3 Drawing Sheets

A network device updates, activates, or indicates parameter information of a first channel or a first reference signal RS by using a MAC CE command — S102

A terminal device determines parameter information of a second channel or a second RS under a preset condition, based on the parameter information of the first channel or the first reference signal RS — S104

(51) Int. Cl.
    *H04W 72/044*     (2023.01)
    *H04W 72/21*     (2023.01)
    *H04W 72/542*     (2023.01)
    *H04W 80/02*     (2009.01)

(52) U.S. Cl.
    CPC ......... *H04W 72/21* (2023.01); *H04W 72/542* (2023.01); *H04W 80/02* (2013.01)

(58) Field of Classification Search
    USPC ........................................................ 370/329
    See application file for complete search history.

(56) References Cited

U.S. PATENT DOCUMENTS

| | | | |
|---|---|---|---|
| 2020/0163074 A1 | 5/2020 | Tang et al. | |
| 2020/0351069 A1 | 11/2020 | Grant et al. | |
| 2021/0058932 A1 | 2/2021 | Takeda et al. | |

FOREIGN PATENT DOCUMENTS

| | | | |
|---|---|---|---|
| WO | 2019020035 A1 | 1/2019 | |
| WO | 2019029631 A1 | 2/2019 | |
| WO | 2019171518 A1 | 9/2019 | |
| WO | 2019203711 A1 | 10/2019 | |

OTHER PUBLICATIONS

Extended European Search Report for Application No. 20885512.2, Dec. 19, 2022, 13 pages.
Huawei et al: "MAC CE signalling for multi-beam enhancement", 3GPP Draft; R2-1914676, Nov. 7, 2019, 13 pages.
LG Electronics: "[Draft] LS on simultaneous TCI state activation and spatial relation update across multiple CCs/BWPs by MAC-CE", 3GPP Draft; RI-1911615, Chongqing, China, Oct. 22, 2019, 3 pages.
NTT DOCOMO et al: "Discussion on multi-beam enhancement", 3GPP Draft; RI-1911185, Chongqing, China, Oct. 4, 2019, 20 pages.
First Office Action for Japanese Application No. 2022-521483, dated Jun. 16, 2023, 5 Pages.
ZTE "Further details on multi-beam/TRP operation" 3GPP TSG RAN WG1 Meeting #98, R1-1908194, Prague, CZ, Aug. 2019, 17 Pages.
First Office Action for Indian Application No. 202227032503, dated Oct. 11, 2022, 7 Pages (including English Translation).
International Search Report and Written Opinion for Application No. PCT/CN2020/126502, dated Jan. 27, 2021, 9 Pages.
VIVO, "Remaining Issues on Multi-Beam Transmission, " 3GPP TSG RAN WG1 #99, Agenda item 7.2.8.3, Nov. 18-22, 2019, R1-1912040, Reno, NV, USA, 10 Pages.
Samsung, "Discussion on RRM Requirement Scope for Rel-16 NR eMIMO WI," 3GPP TSG-RAN WG4 #92bis, Agenda item 8.11.2, Oct. 14-18, 2019, R4-1911388, Chongqing, China, 7 Pages.
Samsung, "Discussion on Enhancement on UL/DL Transmit Beam Selection with Reduced Latency and Overhead," 3GPP TSG-RAN WG4 #92bis, Agenda item 8.11.2.3, Oct. 14-18, 2019, R4-1911392, Chongqing, China, 9 Pages.
First Office Action for Singapore Application No. 11202204675W, dated Aug. 29, 2024, 10 Pages.
Qualcomm Incorporated "Enhancements on Multi-beam Operation" 3GPP TSG-RAN WG1 Meeting #98, Prague, Czech, Aug. 2019, R1-1909273, 19 Pages.
Huawei, HiSilicon "Enhancements on multi-beam operation" 3GPP TSG RAN WG1 Meeting #98bis, Chongqing, China, Oct. 2019, R1-1910074, 18 Pages.
OPPO "Discussion on Multi-beam Operation Enhancements" 3GPP TSG RAN WG1 #98bis, Chongqing, China, Oct. 2019, R1-1910117, 11 Pages.

\* cited by examiner

CHANNEL INFORMATION DETERMINING METHOD, NETWORK DEVICE, AND TERMINAL DEVICE

CROSS-REFERENCE TO RELATED APPLICATIONS

This application is a continuation of International Application No. PCT/CN2020/126502 filed on Nov. 4, 2020, which claims priority to Chinese Patent Application No. 201911090003.8, filed on Nov. 8, 2019, which are incorporated herein by reference in their entireties.

TECHNICAL FIELD

This application relates to the communications field, and in particular, to a channel information determining method, a network device, and a terminal device.

BACKGROUND

During standardization of the new radio (NR) communications system by the Third Generation Partnership Project (3GPP), operating frequency bands supported by the system is upgraded to above 6 GHz. Idle frequency resources are relatively abundant in high bands, which can provide greater throughput for data transmission. High-frequency signals feature short wavelengths, and in comparison with low bands, for high bands, more antenna array elements can be arranged on an antenna panel of a same size to form beams with greater directivity and narrower lobes by using a beamforming technology.

Analog beamforming is based on full-bandwidth transmission, and antenna elements of each polarization direction on a panel of each high-frequency antenna array can transmit analog beams only in a time-division multiplexing manner. Beamforming weights of the analog beams are implemented by adjusting parameters of devices such as a phase shifter on the radio frequency front-end.

At present, in the academia and industrial fields, a polling manner is usually used for training of analog beamforming vectors, that is, the array elements of each polarization direction of each antenna panel send training signals (that is, candidate beamforming vectors) in turn at appointed times in a time-division multiplexing manner. A terminal feeds back a beam report after measurement, so that the network side can use the training signals to implement analog beam transmission for next service transmission. Content of the beam report usually includes identifiers of several optimal transmit beams and a measured received power of each transmit beam.

After beam measurement and beam reporting, the network may perform beam indication for downlink and uplink channels or reference signals, so as to establish beam links between the network and the terminal, thereby implementing channel or reference signal transmission. In the prior art, beam indication is performed in the following manners:

For beam indication for physical downlink control channels (PDCCH), the network configures K transmission configuration indication (TCI) states for each control resource set (CORESET) by using radio resource control (RRC) signaling. When K>1, one TCI state is indicated or activated by a media access control (MAC) control element (CE); when K=1, no additional MAC CE command is required. During PDCCH monitoring, a terminal device (UE) uses the same quasi-colocation (QCL) for all search spaces of CORESET, that is, using the same TCI state for monitoring the PDCCH. A reference signal (RS) in the TCI state is spatially QCLed with a UE-specific PDCCH demodulation reference signal (DMRS) port. The UE can learn, according to the TCI state, which receive beam is used for receiving the PDCCH.

With regard to beam indication for physical downlink shared channels (PDSCH), the network configures M TCI states by using radio resource control (RRC) signaling, activates $2^N$ TCI states by using a MAC CE command, and then notifies the TCI states by using an N-bit TCI field in downlink control information (DCI). An RS in the TCI state is QCLed with a DMRS port of the PDSCH to be scheduled. The UE can learn, according to the TCI state, which receive beam is used for receiving the PDSCH.

With regard to beam indication for channel state information-reference signals (CSI-RS), when a CSI-RS type is a periodic CSI-RS, the network configures QCL information for a CSI-RS resource by using RRC signaling. When a CSI-RS type is a semi-persistent CSI-RS, the network indicates its QCL information when activating one CSI-RS resource from an RRC-configured CSI-RS resource set by using a MAC CE command. When a CSI-RS type is an aperiodic CSI-RS, the network configures QCL for a CSI-RS resource by using RRC signaling, and triggers the CSI-RS by using DCI.

With regard to beam indication for physical uplink control channels (PUCCH), the network configures spatial relation information for each PUCCH resource by using the PUCCH-SpatialRelationInfo parameter in RRC signaling. When a plurality of pieces of spatial relation information are configured for a PUCCH resource, one piece of spatial relation information is indicated or activated by using a MAC CE. When only one piece of spatial relation information is configured for the PUCCH resource, no additional MAC CE command is required.

With regard to beam indication for physical uplink shared channels (PUSCH), spatial relation information of the PUSCH indicates that when DCI carried by a PDCCH schedules the PUSCH, each resource indicator information (resource indicator SRS, SRI) codepoint in an SRI field of the DCI indicates one SRI, and the SRI is used to indicate spatial relation information of the PUSCH.

With regard to beam indication for channel sounding reference signals (SRS), when an SRS type is periodic SRS, the network configures spatial relation information for an SRS resource by using RRC signaling. When an SRS type is semi-persistent SRS, the network activates, by using a MAC CE command, one of a set of spatial relation information configured by using RRC signaling. When an SRS type is aperiodic SRS, the network configures spatial relation information for an SRS resource by using RRC signaling.

It can be learned that configuration or indication manners for channel information are not good enough in the prior art, and are not applicable to some scenarios with multiple component carriers (CC), multiple bandwidth parts (BWP), or multiple transmission and reception points (TRP).

SUMMARY

An objective of embodiments of this application is to provide a channel information determining method, a network device, and a terminal device, so as to address the problems of signaling overheads and delays during updating, activation, or indication of channel information by using a MAC CE command in multi-CC, multi-BWP, or multi-TRP scenarios.

In order to resolve the foregoing technical problem, the embodiments of this application are implemented as follows:

According to a first aspect, an embodiment of this application provides a channel information determining method, where the method is applied to a network device and includes: updating, activating, or indicating parameter information of a first channel or a first reference signal RS by using a media access control MAC control element CE command, where the parameter information of the first channel or the first reference signal RS is used for determining the parameter information of a second channel or a second RS under a preset condition. The parameter information includes at least one of transmission configuration indicator TCI state information, spatial relation information, and path loss PL RS. The preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

According to a second aspect, an embodiment of this application provides a channel information determining method, where the method is applied to a terminal device and includes: determining parameter information of a second channel or a second RS under a preset condition, based on parameter information of a first channel or a first reference signal RS, where the parameter information of the first channel or the first reference signal RS is updated, activated, or indicated by a network device by using a media access control MAC control element CE command; where the parameter information includes at least one of transmission configuration indicator TCI state information, spatial relation information, and path loss PL RS; and the preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

According to a third aspect, an embodiment of this application further provides a network device, where the network device includes: an updating, activating, or indicating module, configured to update, activate, or indicate parameter information of a first channel or a first reference signal RS by using a media access control MAC control element CE command, where the parameter information of the first channel or the first reference signal RS is used for determining the parameter information of a second channel or a second RS under a preset condition. The parameter information includes at least one of transmission configuration indicator TCI state information, spatial relation information, and path loss PL RS. The preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

According to a fourth aspect, an embodiment of this application provides a terminal device, where the terminal device includes: a determining module, configured to determine parameter information of a second channel or a second RS under a preset condition, based on parameter information of a first channel or a first reference signal RS, where the parameter information of the first channel or the first reference signal RS is updated, activated, or indicated by a network device by using a media access control MAC control element CE command. The parameter information includes at least one of transmission configuration indicator TCI state information, spatial relation information, and path loss PL RS. The preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

According to a fifth aspect, an embodiment of this disclosure further provides a network device, including a memory, storing a computer program instruction; and a processor, where when the computer program instruction is executed by the processor, the channel information determining method according to the first aspect is implemented.

According to a sixth aspect, an embodiment of this disclosure further provides a terminal device, including a memory, storing a computer program instruction; and a processor, where when the computer program instruction is executed by the processor, the channel information determining method according to the second aspect is implemented.

According to a seventh aspect, an embodiment of this application further provides a computer-readable storage medium, where the computer-readable storage medium includes an instruction, and when the instruction runs on a computer, the computer executes the channel information determining method according to the first aspect or the second aspect.

In the embodiments of this application, the network device updates, activates, or indicates the parameter information of the first channel or the first RS by using the MAC CE command, so that the terminal device can determine the parameter information of the second channel or the second RS that is under the preset condition, based on the parameter information of the first channel or the first RS. The preset condition includes at least one of the following: that at least one PUCCH resource group has been configured on at least one BWP; that a plurality of PUCCH resources have been configured in a multi-CC scenario; that a plurality of PUCCH resource groups have been configured in a multi-CC scenario; a multi-TRP scenario; that a plurality of CSI-RS resources or a plurality of SRS resources have been configured in a multi-CC scenario; that a plurality of path loss (PL) RSs and a plurality of SRS resource sets have been configured in a multi-CC scenario; and that no PL RS for a PUCCH or an SRS resource set has been configured. Therefore, in this technical solution, the method for determining the parameter information of the second channel or the second RS under different conditions is improved, and only the parameter information of the first channel or the first RS needs to be updated, activated, or indicated by using the MAC CE command, thereby reducing signaling overheads and delays during configuration or indication of channel information.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show merely some embodiments recorded in this application, and a person of ordinary skill in the art may still derive other drawings from these accompanying drawings without creative efforts.

DETAILED DESCRIPTION

The following clearly and completely describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The technical solutions of this application may be applied to various communications systems, such as a global system for mobile communications (GSM), a code division multiple access (CDMA) system, wideband code division multiple access (WCDMA), general packet radio service (GPRS), long term evolution (LTE)/long term evolution advanced (LTE-A) system, and NR (New Radio).

A terminal device (UE) is also referred to as a mobile terminal, a mobile terminal device, or the like, and may communicate with one or more core networks through a radio access network (RAN). The user equipment may be a terminal device, such as a mobile phone (or referred to as a "cellular" phone) or a computer with a terminal device. For example, the user equipment may be a portable, pocket-sized, handheld, computer built-in, or in-vehicle mobile apparatus, which exchanges voice and/or data with the radio access network.

A network device may be a base station (BTS) in GSM or CDMA, or may be a base station (NodeB) in WCDMA, or may be an evolved NodeB (eNB or e-NodeB) in LTE or a 5G NodeB (gNB), which is not limited in this application. However, for ease of description, the following embodiments are described by using a gNB as an example.

The technical solutions provided in the embodiments of this application are described in detail below with reference to the accompanying drawings.

Figure 1:
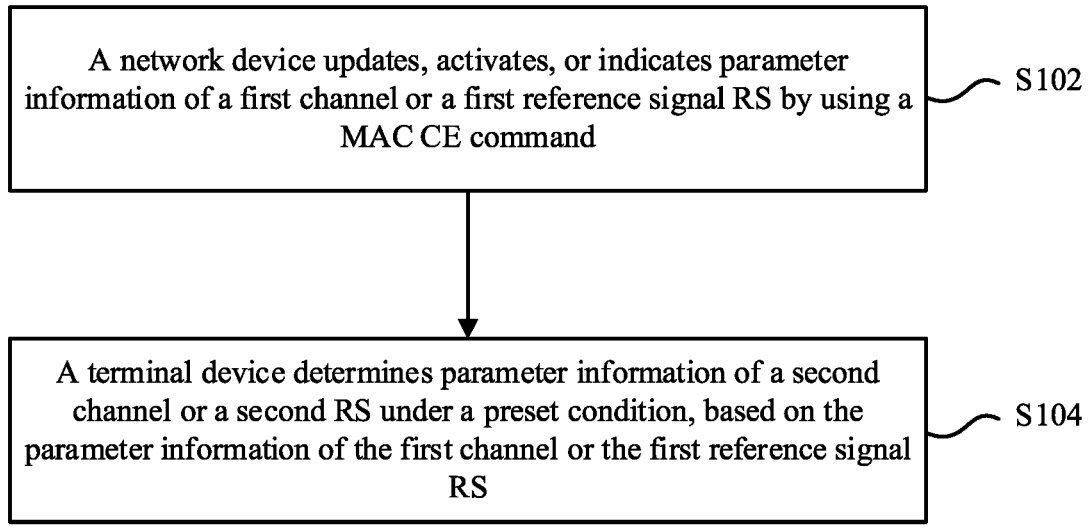
FIG. 1 is a method flowchart of a channel information determining method according to an embodiment of this application.

FIG. 1 is a schematic flowchart of a channel information determining method according to an embodiment of this application. The method may be performed by an electronic device, such as a terminal device or a network device. In other words, the method may be performed by software or hardware installed on the terminal device or the network device. The method in FIG. 1 may include the following steps.

S102: The network device updates, activates, or indicates parameter information of a first channel or a first reference signal RS by using a MAC CE command.

S104: The terminal device determines parameter information of a second channel or a second RS under a preset condition, based on the parameter information of the first channel or the first reference signal RS.

The parameter information is configured by the network device by using RRC signaling. The parameter information includes at least one of transmission configuration indicator TCI state information, spatial relation information, and path loss PL RS; and the preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

In this embodiment of this application, the network device updates, activates, or indicates the parameter information of the first channel or the first RS by using the MAC CE command, so that the terminal device can determine the parameter information of the second channel or the second RS that is under the preset condition, based on the parameter information of the first channel or the first RS. The preset condition includes at least one of the following: that at least one PUCCH resource group has been configured on at least one BWP; that a plurality of PUCCH resources have been configured in a multi-CC scenario; that a plurality of PUCCH resource groups have been configured in a multi-CC scenario; a multi-TRP scenario; that a plurality of CSI-RS resources or a plurality of SRS resources have been configured in a multi-CC scenario; that a plurality of PL RSs and a plurality of SRS resource sets have been configured in a multi-CC scenario; and that no PL RS for a PUCCH or an SRS resource set has been configured. Therefore, in this technical solution, the method for determining the parameter information of the second channel or the second RS under different conditions (scenarios) is improved, and only the parameter information of the first channel or the first RS needs to be updated, activated, or indicated by using the MAC CE command, thereby reducing signaling overheads and delays during configuration or indication of channel information.

The following describes in detail how the network device updates, activates, or indicates the parameter information of the first channel or the first reference signal RS by using the MAC CE command, and how the terminal device determines the parameter information of the second channel or the second RS under different preset conditions.

In an embodiment, before updating, activating, or indicating the parameter information of the first channel or the first reference signal RS by using the MAC CE, the network device may configure at least one common CC list for uplink UL and downlink DL by using RRC signaling. CCs of the configured at least one common CC list are all in an activated state or a deactivated state. Then, the terminal device receives, from the network device, the at least one common CC list configured for uplink and downlink.

In an embodiment, the CCs in the at least one common CC list are located in a same band or different bands. In addition, if the CCs are located in different bands, the CC list carries band information corresponding to the different bands.

In an embodiment, the first channel includes a first PUCCH resource of a first PUCCH resource group on a first BWP, or the first channel includes all PUCCH resources of the first PUCCH resource group on the first BWP. The second channel includes all PUCCH resources in the first PUCCH resource group.

The parameter information includes the spatial relation information, the preset condition includes that at least one PUCCH resource group has been configured on at least one BWP, and PUCCH resources of each PUCCH resource group are located in a same bandwidth part BWP.

In this embodiment, if the network device uses the MAC CE command to update, activate, or indicate spatial relation information of the first channel as first spatial relation information, the terminal device determines that spatial relation information of the second channel is the first spatial relation information.

The first channel and the second channel are located in the same BWP and the same PUCCH resource group. Specifically, in a case that the first channel includes a first PUCCH resource of a first PUCCH resource group on a first BWP, or that the first channel includes all PUCCH resources of the first PUCCH resource group on the first BWP, the second channel includes all the PUCCH resources of the first PUCCH resource group. To be specific, if the network device uses the MAC CE command to update, activate, or indicate spatial relation information of the first PUCCH resource in the first PUCCH resource group on the first BWP as the first spatial relation information, or the network device uses the MAC CE command to update, activate, or indicate spatial relation information of all the PUCCH resources of the first PUCCH resource group on the first BWP as the first spatial relation information, the terminal device determines the spatial relation information of all the PUCCH resources of the first PUCCH resource group is the first spatial relation information.

In this embodiment, if the network device uses the MAC CE command to update, activate, or indicate spatial relation information of the first PUCCH resource in the first PUCCH resource group on the first BWP as the first spatial relation information, the MAC CE command received by the terminal device may carry identification information of the first BWP, identification information of the first PUCCH resource, and the first spatial relation information. Certainly, content of information carried in the MAC CE command is not limited thereto, for example, the MAC CE command received by the terminal device may also carry identification information of a cell in which the first BWP is located.

If the network device uses the MAC CE command to update, activate, or indicate the spatial relation information of all the PUCCH resources of the first PUCCH resource group on the first BWP as the first spatial relation information, the MAC CE command received by the terminal device may carry identification information of the first BWP, identification information of the first PUCCH resource group, and the first spatial relation information. Certainly, content of information carried in the MAC CE command is not limited thereto, for example, the MAC CE command received by the terminal device may also carry identification information of a cell in which the first BWP is located.

In an embodiment, the parameter information includes the spatial relation information, and the preset condition includes that a plurality of PUCCH resources have been configured in a multi-CC scenario.

In this embodiment, if the network device uses the MAC CE command to update, activate, or indicate spatial relation information of the first channel as second spatial relation information, the terminal device determines that spatial relation information of the second channel is the second spatial relation information.

The first channel and the second channel are located in the same CC list, the same CC, and the same BWP. Specifically, in a case that the first channel includes a second PUCCH resource on a second BWP of a first CC in a first CC list, the second channel includes a third PUCCH resource; or in a case that the first channel includes PUCCH resources having a same first resource identifier on all BWPs of all CCs in the first CC list, the second channel includes the PUCCH resources having the first resource identifier on all the BWPs of all the CCs in the first CC list; or in a case that the first channel includes all PUCCH resources on all BWPs of all CCs in the first CC list, the second channel includes all the PUCCH resources on all the BWPs of all the CCs in the first CC list. That is, if the network device uses the MAC CE command to update, activate, or indicate spatial relation information of the second PUCCH resource on the second BWP of the first CC in the first CC list as the second spatial relation information, the terminal device determines that spatial relation information of the third PUCCH resource is the second spatial relation information. In this case, the MAC CE command received by the terminal device may carry identification information of the first CC, identification information of the second BWP, identification information of the second PUCCH resource, and the second spatial relation information. Certainly, content of information carried in the MAC CE command is not limited thereto.

The third PUCCH resource includes at least one of the following: all PUCCH resources on all BWPs of at least one CC in the first CC list, PUCCH resources that have a same resource identifier as the second PUCCH resource and that are on all BWPs of at least one CC in the first CC list, all PUCCH resources on the first CC, and all PUCCH resources on the second BWP.

If the network device uses the MAC CE command to update, activate, or indicate spatial relation information of the PUCCH resources having the same first resource identifier on all the BWPs of all the CCs in the first CC list as the second spatial relation information, the terminal device determines that the spatial relation information of the PUCCH resources having the first resource identifier on all the BWPs of all the CCs in the first CC list is the second spatial relation information. In this case, the MAC CE command received by the terminal device may carry identification information of the first CC list, information about the first resource identifier of the PUCCH resource, and the second spatial relation information. Certainly, content of information carried in the MAC CE command is not limited thereto.

If the network device uses the MAC CE command to update, activate, or indicate spatial relation information of all the PUCCH resources on all the BWPs of all the CCs in the first CC list as the second spatial relation information, the terminal device determines that the spatial relation information of all the PUCCH resources on all the BWPs of all the CCs in the first CC list is the second spatial relation information. In this case, the MAC CE command received by the terminal device may carry identification information of the first CC list, the second spatial relation information, and a channel or RS type. Certainly, content of information carried in the MAC CE command is not limited thereto.

In an embodiment, the parameter information includes the spatial relation information, and the preset condition includes that a plurality of PUCCH resource groups have been configured in a multi-CC scenario.

In this embodiment, if the network device uses the MAC CE command to update, activate, or indicate spatial relation information of the first channel as third spatial relation information, the terminal device determines that spatial relation information of the second channel is the third spatial relation information.

The first channel and the second channel are located in the same CC list, the same CC, the same BWP, and the same PUCCH resource group. Specifically, in a case that the first channel includes all PUCCH resources of a second PUCCH resource group on a third BWP of a second CC in a second CC list, the second channel includes all PUCCH resources of a third PUCCH resource group; or in a case that the first channel includes all PUCCH resources of PUCCH resource groups having a same first resource group identifier on all BWPs of all CCs in the second CC list, the second channel includes all PUCCH resources of the PUCCH resource groups having the first resource group identifier on all the BWPs of all the CCs in the second CC list; or in a case that the first channel includes all PUCCH resources of all PUCCH resource groups on all BWPs of all CCs in the second CC list, the second channel includes all the PUCCH resources of all the PUCCH resource groups on all the BWPs of all the CCs in the second CC list.

The third PUCCH resource group includes at least one of the following: all PUCCH resource groups on all BWPs of at least one CC in the second CC list, PUCCH resource groups that have a same resource group identifier as the second PUCCH resource group and that are on all BWPs of at least one CC in the second CC list, all PUCCH resource groups on the second CC, and all PUCCH resource groups on the third BWP.

That is, if the network device uses the MAC CE command to update, activate, or indicate spatial relation information of all the PUCCH resources of the second PUCCH resource group on the third BWP of the second CC in a second CC list as the third spatial relation information, the terminal device determines that spatial relation information of the third PUCCH resource group is the third spatial relation information. In this case, the MAC CE command received by the terminal device may carry identification information of the second CC, identification information of the third BWP, identification information of the second PUCCH resource group, and the third spatial relation information. Certainly, content of information carried in the MAC CE command is not limited thereto.

If the network device uses the MAC CE command to update, activate, or indicate spatial relation information of all the PUCCH resources of the PUCCH resource groups having the same first resource group identifier on all the BWPs of all the CCs in the second CC list as the third spatial relation information, the terminal device determines that the spatial relation information of all the PUCCH resources of the PUCCH resource groups having the first resource group identifier on all the BWPs of all the CCs in the second CC list is the third spatial relation information. In this case, the MAC CE command received by the terminal device may carry identification information of the second CC list, information about the first resource group identifier of the PUCCH resource group, and the third spatial relation information. Certainly, content of information carried in the MAC CE command is not limited thereto.

If the network device uses the MAC CE command to update, activate, or indicate spatial relation information of all the PUCCH resources of all the PUCCH resource groups on all the BWPs of all the CCs in the second CC list as the third spatial relation information, the terminal device determines that the spatial relation information of all the PUCCH resources of all the PUCCH resource groups on all the BWPs of all the CCs in the second CC list is the third spatial relation information. In this case, the MAC CE command received by the terminal device may carry identification information of the second CC list, the third spatial relation information, and a channel or RS type. Certainly, content of information carried in the MAC CE command is not limited thereto.

In an embodiment, the parameter information includes the spatial relation information, the preset condition includes that a plurality of SRS resources have been configured in a multi-CC scenario, and the SRS resources are semi-persistent or aperiodic SRS resources.

In this embodiment, if the network device uses the MAC CE command to update, activate, or indicate spatial relation information of the first RS as fourth spatial relation information, the terminal device determines that spatial relation information of the second RS is the fourth spatial relation information.

The first RS and the second RS are located in the same CC list, the same CC, and the same BWP. Specifically, in a case that the first RS includes a first SRS resource on a fourth BWP of a third CC in a third CC list, the second RS includes all SRS resources that have a same resource identifier as the first SRS resource and that are on all BWPs of at least one CC in the third CC list; or in a case that the first RS includes SRS resources having a same second resource identifier on all BWPs of all CCs in the third CC list, the second RS includes the SRS resources having the second resource identifier on all the BWPs of all the CCs in the third CC list; or in a case that the first RS includes all SRS resources on all the BWPs of all the CCs in the third CC list, the second RS includes all the SRS resources on all the BWPs of all the CCs in the third CC list.

That is, if the network device uses the MAC CE command to update, activate, or indicate spatial relation information of the first SRS resource on the fourth BWP of the third CC in the third CC list as the fourth spatial relation information, the terminal device determines that the spatial relation information of all SRS resources that have a same resource identifier as the first SRS resource and that are on all BWPs of at least one CC in the third CC list is the fourth spatial relation information. In this case, the MAC CE command received by the terminal device may carry identification information of the third CC, identification information of the fourth BWP, identification information of the first SRS resource, and the fourth spatial relation information. Certainly, content of information carried in the MAC CE command is not limited thereto.

If the network device uses the MAC CE command to update, activate, or indicate spatial relation information of the SRS resources having the same second resource identifier on all the BWPs of all the CCs in the third CC list as the fourth spatial relation information, the terminal device determines that the spatial relation information of the SRS resources having the second resource identifier on all the BWPs of all the CCs in the third CC list is the fourth spatial relation information. In this case, the MAC CE command received by the terminal device may carry identification information of the third CC list, information about the second resource identifier of the SRS resource, and the fourth spatial relation information. Certainly, content of information carried in the MAC CE command is not limited thereto.

If the network device uses the MAC CE command to update, activate, or indicate spatial relation information of all the SRS resources on all the BWPs of all the CCs in the third CC list as the fourth spatial relation information, the terminal device determines that the spatial relation information of all the SRS resources on all the BWPs of all the CCs in the third CC list is the fourth spatial relation information. In this case, the MAC CE command received by the terminal device may carry identification information of the third CC list, the fourth spatial relation information, and a channel or RS type. Certainly, content of information carried in the MAC CE command is not limited thereto.

In this embodiment, a parameter usage of an SRS resource set to which the first SRS resource belongs is configured to be codebook codebook, noncodebook nonCodebook, or antenna switching antennaSwitching.

In an embodiment, a source RS in spatial relation information of each of the SRS resources is configured to be a downlink DL RS.

In an embodiment, the first channel is an uplink channel, or the first RS is an uplink RS. The network device may configure a same source RS for same spatial relation information of the uplink channel or uplink RS.

In an embodiment, the parameter information includes the TCI state information, the preset condition includes that a plurality of CSI-RS resources have been configured in a multi-CC scenario, and each of the CSI-RS resources is a semi-persistent or aperiodic CSI-RS resource.

In this embodiment, if the network device uses the MAC CE command to update, activate, or indicate TCI state information of the first RS as first TCI state information, the terminal device determines that TCI state information of the second RS is the first TCI state information.

The first RS and the second RS are located in the same CC list, the same CC, and the same BWP. Specifically, in a case that the first RS includes a first CSI-RS resource on a fifth BWP of a fourth CC in a fourth CC list, the second RS includes second CSI-RS resources that have a same CSI-RS resource identifier as the first CSI-RS resource and that are on all BWPs of at least one CC in the fourth CC list; or in a case that the first RS includes CSI-RS resources having a same third resource identifier on all the BWPs of all the CCs in the fourth CC list, the second RS includes the CSI-RS resources having the third resource identifier on all the BWPs of all the CCs in the fourth CC list; or in a case that the first RS includes all CSI-RS resources on all the BWPs of all the CCs in the fourth CC list, the second RS includes all the CSI-RS resources on all the BWPs of all the CCs in the fourth CC list.

That is, if the network device uses the MAC CE command to update, activate, or indicate TCI state information of the first CSI-RS resource on the fifth BWP of the fourth CC in the fourth CC list as the first TCI state information, the terminal device determines that the TCI state information of the second CSI-RS resources that have the same CSI-RS resource identifier as the first CSI-RS resource and that are on all BWPs of at least one CC in the fourth CC list is the first TCI state information. In this case, the MAC CE command received by the terminal device may carry identification information of the fourth CC, identification information of the fifth BWP, identification information of the first CSI-RS resource, and the first TCI state information. Certainly, content of information carried in the MAC CE command is not limited thereto.

If the network device uses the MAC CE command to update, activate, or indicate TCI state information of the CSI-RS resources having the same third resource identifier on all the BWPs of all the CCs in the fourth CC list as the first TCI state information, the terminal device determines that the TCI state information of the CSI-RS resources having the same third resource identifier on all the BWPs of all the CCs in the fourth CC list is the first TCI state information. In this case, the MAC CE command received by the terminal device may carry identification information of the fourth CC list, information about the third resource identifier of the CSI-RS resource, and the first TCI state information. Certainly, content of information carried in the MAC CE command is not limited thereto.

If the network device uses the MAC CE command to update, activate, or indicate TCI state information of all the CSI-RS resources on all the BWPs of all the CCs in the fourth CC list as the first TCI state information, the terminal device determines that the TCI state information of all the CSI-RS resources on all the BWPs of all the CCs in the fourth CC list is the first TCI state information. In this case, the MAC CE command received by the terminal device may carry identification information of the fourth CC list, the first TCI state information, and a channel or RS type. Certainly, content of information carried in the MAC CE command is not limited thereto.

In this embodiment, the CSI-RS resource is configured by the network device for measuring information such as CSI, channel quality indication (CQI), precoding matrix indicator (PMI), rank indicator (RI), and beam failure detection.

In an embodiment, the parameter information includes the TCI state information. With regard to TCI states with a same TCI state identifier, the network device configures same QCL-TypeD RSs for the TCI states for different cell identifiers, and configures same or different QCL-TypeA RSs and QCL-TypeD RSs for the TCI states for a same cell identifier.

In an embodiment, the parameter information includes the PL RS, and the preset condition includes that a plurality of PL RSs and a plurality of SRS resource sets have been configured in a multi-CC scenario.

In this embodiment, if a PL RS of the first RS that is updated, activated, or indicated by using the MAC CE command by the network device is a first PL RS, the terminal device determines that a PL RS of the second RS is the first PL RS, or determines that a PL RS identifier corresponding to the PL RS of the second RS is a PL RS identifier corresponding to the first PL RS.

The first RS and the second RS are located in the same CC list, the same CC, the same BWP, and the same SRS resource set. Specifically, in a case that the first RS includes a first SRS resource set on a sixth BWP of a fifth CC in a fifth CC list, the second RS includes a second SRS resource set; or in a case that the first RS includes SRS resource sets having a same first resource set identifier on all the BWPs of all the CCs in the fifth CC list, the second RS includes the SRS resource sets having the first resource set identifier on all the BWPs of all the CCs in the fifth CC list; or in a case that the first RS includes all SRS resource sets on all the BWPs of all the CCs in the fifth CC list, the second RS includes all the SRS resource sets on all the BWPs of all the CCs in the fifth CC list.

The second SRS resource set includes at least one of the following: SRS resource sets that have a same SRS resource set identifier as the first SRS resource set and that are on all BWPs of at least one CC in the fifth CC list, SRS resource sets that have at least one same SRS resource as the first SRS resource set and that are on all BWPs of at least one CC in the fifth CC list, and all SRS resource sets on all BWPs of at least one CC of the fifth CC list.

That is, if the network device uses the MAC CE command to update, activate, or indicate a PL RS of the first SRS resource set on the sixth BWP of the fifth CC in the fifth CC list as the first PL RS, the terminal device determines that a PL RS of the second SRS resource set is the first PL RS, or determines that a PL RS identifier corresponding to the PL RS of the second SRS resource set is a PL RS identifier of the first PL RS. In this case, the MAC CE command received by the terminal device may carry identification information of the fifth CC, identification information of the sixth BWP, identification information of the first SRS resource set, and the first PL RS. Certainly, content of information carried in the MAC CE command is not limited thereto.

If the network device uses the MAC CE command to update, activate, or indicate a PL RS of the SRS resource sets having the same first resource set identifier on all the BWPs of all the CCs in the fifth CC list as the first PL RS, the terminal device determines that the PL RS of the SRS resource sets having the first resource set identifier on all the BWPs of all the CCs in the fifth CC list is the first PL RS, or the terminal device determines that a PL RS identifier corresponding to the PL RS of the SRS resource sets having the first resource set identifier on all the BWPs of all the CCs in the fifth CC list is a PL RS identifier of the first PL RS. In this case, the MAC CE command received by the terminal device may carry identification information of the fifth CC list, information about the first resource set identifier of the SRS resource set, and the first PL RS. Certainly, content of information carried in the MAC CE command is not limited thereto.

If the network device uses the MAC CE command to update, activate, or indicate a PL RS of all the SRS resource sets on all the BWPs of all the CCs in the fifth CC list as the first PL RS, the terminal device determines that the PL RS of all the SRS resource sets on all the BWPs of all the CCs in the fifth CC list is the first PL RS, or determines that a PL RS identifier corresponding to the PL RS of all the SRS resource sets on all the BWPs of all the CCs in the fifth CC list is a PL RS identifier corresponding to the first PL RS. In this case, the MAC CE command received by the terminal device may carry identification information of the fifth CC list, the first PL RS, and a channel or RS type. Certainly, content of information carried in the MAC CE command is not limited thereto.

In an embodiment, in a case that the number of PL RSs configured for the terminal device by the network device is less than or equal to a preset threshold, it may be determined that the MAC CE takes effect on at least one of the following occasions:

(1) when the terminal device receives the MAC CE;
(2) when first duration elapses after the terminal device receives the MAC CE;
(3) when the terminal device sends confirmation information for the MAC CE;
(4) when third duration elapses after the terminal device sends the confirmation information for the MAC CE;
(5) when the network device receives the confirmation information for the MAC CE from the terminal device; and
(6) when second duration elapses after the network device receives the confirmation information for the MAC CE from the terminal device.

In an embodiment, when the number of PL RSs configured for the terminal device by the network device is less than or equal to the preset threshold, the terminal device keeps tracking and measuring all PL RSs configured by the network device.

In the foregoing embodiment, the preset threshold may be 4, 8, 16, or the like. Using the preset threshold being 4 as an example, when the number of PL RSs configured for the terminal device by the network device is less than or equal to 4, the terminal device keeps tracking and measuring all PL RSs configured by the network device, that is, each time the terminal device detects a PL RS sent by the network device, filtering processing is performed on a current measurement result corresponding to the PL RS and a latest filtering result to obtain a new measurement result of the PL RS, so as to continuously update the measurement result of the PL RS.

In an embodiment, the parameter information includes the PL RS; and the preset condition includes that no PL RS for a PUCCH or an SRS resource set has been configured.

In this embodiment, the first channel includes a PUCCH, and the first RS includes an SRS resource set. The network device indicates one DL RS out of a plurality of DL RSs by using the MAC CE command. Based on this, the terminal device determines that a PL RS of the second RS is the DL RS that is indicated from the plurality of DL RSs by using the MAC CE command. In this case, the MAC CE command received by the terminal device may carry identification information of the indicated DL RS. Certainly, content of information carried in the MAC CE command is not limited thereto.

The first channel includes a PUCCH, or the first RS includes an SRS resource set. The second channel includes a PUCCH, or the second RS includes an SRS resource set. The plurality of DL RSs include at least one of the following: a DL RS in spatial relation information of the PUCCH or an SRS resource in the SRS resource set, a DL RS associated with spatial relation information of the PUCCH or an SRS resource in the SRS resource set, and a DL RS in TCI state information of a preset downlink channel. The preset downlink channel is a downlink channel determined according to a preset rule.

Optionally, in any one of the foregoing embodiments, the second channel is an uplink channel or the second RS is an uplink RS; the parameter information is the spatial relation information or the PL RS; and each CC in the CC list is a CC having an uplink, where the CC having an uplink includes at least one of the following:

(1) a CC having an uplink slot and/or uplink symbol that is configured by using RRC signaling;
(2) a CC having an uplink slot and/or uplink symbol that is indicated by downlink control information DCI; and
(3) a CC that is configured by using RRC signaling to be between a first parameter and a second parameter and that is indicated by DCI to be a CC with an uplink slot and/or uplink symbol, where the first parameter includes a downlink slot and/or a downlink symbol, and the second parameter includes an uplink slot and/or an uplink symbol.

In an embodiment, the second channel includes a first associated channel, or the second RS includes a first associated RS. The preset condition includes a multi-TRP scenario, and the MAC CE command carries CORESET information and/or TRP information. Based on this, the terminal device may determine parameter information of the first associated channel or the first associated RS as the parameter information of the first channel or the first RS.

The first associated channel may include at least one of the following: a channel corresponding to the CORESET information, a channel corresponding to a TRP that is associated with the CORESET information, and a channel corresponding to a TRP that is corresponding to the TRP information.

The first associated RS may include at least one of the following: an RS corresponding to the CORESET information, an RS corresponding to a TRP that is associated with the CORESET information, and an RS corresponding to a TRP that is corresponding to the TRP information.

In this embodiment, the CORESET information and/or TRP information is used to indicate a TRP corresponding to the first channel or the first RS; or the CORESET information and/or TRP information is used to indicate a TRP corresponding to the second channel or the second RS.

Optionally, the first channel and the first associated channel correspond to same CORESET information and/or TRP information; and the first RS and the first associated RS correspond to same CORESET information and/or TRP information.

In addition, the multi-TRP scenario may be combined with any other preset conditions. That is, in a case that the preset condition includes the multi-TRP scenario, at least one other scenario may be further included. The following uses specific embodiments to describe scenarios in which the multi-TRP scenario is combined with other preset conditions.

For example, the preset condition includes that a plurality of PUCCH resources have been configured in a multi-CC scenario, and also includes a multi-TRP scenario. The first channel and the first associated channel correspond to same TRP information, and the first RS and the first associated RS correspond to same TRP information. The MAC CE command carries the TRP information. It is assumed that the TRP information carried in the MAC CE command is used to indicate that a TRP corresponding to the first channel or the first RS is TRP1. According to the foregoing embodiment, in a case that a plurality of PUCCH resources have been configured in a multi-CC scenario, the network device may use the MAC CE command to update, activate, or indicate the spatial relation information of the second PUCCH resource on the second BWP of the first CC in the first CC list as the second spatial relation information. The TRP corresponding to the first channel or the first RS is TRP1, and therefore, the terminal device can determine that spatial relation information of all PUCCH resources corresponding to the TRP1 on all the BWPs of all the CCs in the first CC list is the second spatial relation information. That is, when the terminal device determines the spatial relation information of the second channel (or the first associated channel) or the second RS (or the second associated RS), the spatial relation information for one TRP corresponding to the first channel or the first RS is targeted.

For another example, the preset condition includes that a plurality of PUCCH resource groups have been configured in a multi-CC scenario, and also includes a multi-TRP scenario. The first channel and the first associated channel correspond to same TRP information, and the first RS and the first associated RS correspond to same TRP information. The MAC CE command carries the TRP information. It is assumed that the TRP information carried in the MAC CE command is used to indicate that a TRP corresponding to the first channel or the first RS is TRP2. According to the foregoing embodiment, in a case that a plurality of PUCCH resource groups have been configured in a multi-CC scenario, the network device may use the MAC CE command to activate, or indicate the spatial relation information of all the PUCCH resources of the second PUCCH resource group on the third BWP of the second CC in the second CC list as the third spatial relation information. The TRP corresponding to the first channel or the first RS is TRP2, and therefore, the terminal device can determine that spatial relation information of all PUCCH resources corresponding to the TRP2 on all the BWPs of all the CCs in the second CC list is the second spatial relation information. That is, when the terminal device determines the spatial relation information of the second channel (or the first associated channel) or the second RS (or the second associated RS), the spatial relation information for one TRP corresponding to the first channel or the first RS is targeted.

The foregoing describes how the terminal device determines the parameter information of the second channel or the second RS based on the parameter information of the first channel or the first RS in the scenarios in which the multi-TRP scenario is combined with two other preset conditions. It should be noted that in the scenario in which the multi-TRP scenario is combined with any one of other preset conditions, an object determined by the terminal device is the parameter information of the second channel or the second RS in the same TRP corresponding to the first channel or the first RS.

In addition, it should be further noted that "identifier" described in any one of the foregoing embodiments may also mean "index", which is not limited in the embodiments of this specification. For example, "PUCCH resource group identifier" may also be referred to as "PUCCH resource group index"; for another example, "SRS resource set identifier" may also be referred to as "SRS resource set index"; and so on.

The specific embodiments of this specification are described above. Other embodiments fall within the scope of the claims. In some cases, actions or steps described in the claims may be performed in an order different from that in the embodiments, and may still implement desired results. In addition, the processes described in the accompanying drawings are not necessarily performed in an illustrated particular order or sequentially to implement the desired results. In some embodiments, multi-task processing and parallel processing are also acceptable or may be advantageous.

Figure 2:
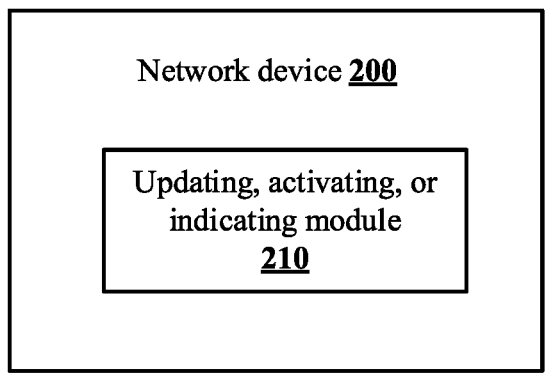
FIG. 2 is a schematic structural diagram of a network device according to an embodiment of this application.

FIG. 2 is a schematic structural diagram of a network device according to an embodiment of this application. Referring to FIG. 2, the network device 200 may include:
an updating, activating, or indicating module 210, configured to update, activate, or indicate parameter information of a first channel or a first reference signal RS by using a media access control MAC control element CE command, where the parameter information of the first channel or the first reference signal RS is used for determining the parameter information of a second channel or a second RS under a preset condition.

The parameter information includes at least one of transmission configuration indicator TCI state information, spatial relation information, and path loss PL RS; and the preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

In an embodiment, the network device 200 further includes:
a first configuration module, configured to: before the parameter information of the first channel or the first reference signal RS is updated, activated, or indicated by using the media access control MAC control element CE, configure at least one common component carrier CC list for uplink and downlink by using radio resource control RRC signaling, where each CC in the at least one common CC list is in an activated state or a deactivated state.

In an embodiment, the CCs in the at least one common CC list are located in a same band or different bands.

In an embodiment, if the CCs are located in different bands, the CC list carries band information corresponding to the different bands.

In an embodiment, the first channel includes a first PUCCH resource of a first PUCCH resource group on a first BWP, or the first channel includes all PUCCH resources of the first PUCCH resource group on the first BWP.

The parameter information includes the spatial relation information, the preset condition includes that at least one PUCCH resource group has been configured on at least one bandwidth part BWP, and PUCCH resources of each PUCCH resource group are located in a same bandwidth part BWP.

The updating, activating, or indicating module 210 is further configured to:
update, activate, or indicate spatial relation information of the first channel as first spatial relation information by using the MAC CE command.

In an embodiment, the first channel includes a second PUCCH resource on a second BWP of a first CC in a first CC list, or the first channel includes PUCCH resources having a same first resource identifier on all BWPs of all CCs in the first CC list, or the first channel includes all PUCCH resources on all the BWPs of all the CCs in the first CC list.

The parameter information includes the spatial relation information, and the preset condition includes that a plurality of PUCCH resources have been configured in a multi-CC scenario.

The updating, activating, or indicating module 210 is further configured to:
update, activate, or indicate spatial relation information of the first channel as second spatial relation information by using the MAC CE command.

In an embodiment, the first channel includes all PUCCH resources of a second PUCCH resource group on a third BWP of a second CC in a second CC list, or the first channel includes all PUCCH resources of PUCCH resource groups having a same first resource group identifier on all BWPs of all CCs in the second CC list; or the first RS includes all PUCCH resources of all PUCCH resource groups on all the BWPs of all the CCs in the second CC list.

The parameter information includes the spatial relation information, and the preset condition includes that a plurality of PUCCH resource groups have been configured in a multi-CC scenario.

The updating, activating, or indicating module 210 is further configured to:
update, activate, or indicate spatial relation information of the first channel as third spatial relation information by using the MAC CE command.

In an embodiment, the first RS includes a first SRS resource on a fourth BWP of a third CC in a third CC list, or the first RS includes SRS resources having a same second resource identifier on all BWPs of all CCs in the third CC list, or the first RS includes all SRS resources on all the BWPs of all the CCs in the third CC list.

The parameter information includes the spatial relation information, the preset condition includes that a plurality of SRS resources have been configured in a multi-CC scenario, and the SRS resources are semi-persistent or aperiodic SRS resources.

The updating, activating, or indicating module 210 is further configured to:
update, activate, or indicate spatial relation information of the first RS as fourth spatial relation information by using the MAC CE command; where
a parameter usage of an SRS resource set to which the first SRS resource belongs is configured to be codebook codebook, noncodebook nonCodebook, or antenna switching antennaSwitching.

In an embodiment, a source RS in spatial relation information of each of the SRS resources is configured to be a downlink DL RS.

In an embodiment, the first channel is an uplink channel, or the first RS is an uplink RS. The network device 200 further includes:
a second configuration module, configured to configure a same source RS for same spatial relation information of the uplink channel or uplink RS.

In an embodiment, the first RS includes a first CSI-RS resource on a fifth BWP of a fourth CC in a fourth CC list, or the first RS includes CSI-RS resources having a same third resource identifier on all BWPs of all CCs in the fourth CC list, or the first RS includes all CSI-RS resources on all the BWPs of all the CCs in the fourth CC list.

The parameter information includes the TCI state information, the preset condition includes that a plurality of CSI-RS resources have been configured in a multi-CC scenario, and each of the CSI-RS resources is a semi-persistent or aperiodic CSI-RS resource.

The updating, activating, or indicating module 210 is further configured to:
update, activate, or indicate TCI state information of the first RS as first TCI state information by using the MAC CE command.

In an embodiment, the CSI-RS resource is configured for measuring at least one of the following: channel state information CSI, channel quality indication CQI, precoding matrix indicator PMI, rank indicator RI, and beam failure detection.

In an embodiment, the parameter information includes the TCI state information. The network device 200 further includes:
a third configuration module, configured to: with regard to TCI states with a same TCI state identifier, configure same quasi-colocation type QCL-TypeD RSs for the TCI states for different cell identifiers, and configure same or different QCL-TypeA RSs and QCL-TypeD RSs for the TCI states for a same cell identifier.

In an embodiment, the first RS includes a first SRS resource set on a sixth BWP of a fifth CC in a fifth CC list, or the first RS includes SRS resource sets having a same first resource set identifier on all BWPs of all CCs in the fifth CC list, or the first RS includes all SRS resource sets on all the BWPs of all the CCs in the fifth CC list.

The parameter information includes the PL RS, and the preset condition includes that a plurality of PL RSs and a plurality of channel sounding reference signal SRS resource sets have been configured in a multi-CC scenario.

The updating, activating, or indicating module 210 is further configured to:
update, activate, or indicate a PL RS of the first RS as a first PL RS by using the MAC CE command.

In an embodiment, the first channel includes a physical uplink control channel PUCCH, or the first RS includes an SRS resource set.

The parameter information includes the PL RS, and the preset condition includes that no PL RS for a physical uplink control channel PUCCH or for an SRS resource set has been configured.

The updating, activating, or indicating module 210 is further configured to:
indicate one DL RS out of a plurality of DL RSs by using the MAC CE command.

The plurality of DL RSs include at least one of the following: a DL RS in spatial relation information of the PUCCH or an SRS resource in the SRS resource set, a DL RS associated with spatial relation information of the PUCCH or an SRS resource in the SRS resource set, and a DL RS in TCI state information of a preset downlink channel; where the preset downlink channel is a downlink channel determined according to a preset rule.

In an embodiment, the preset condition includes a multi-TRP scenario, and the MAC CE command carries control resource set CORESET information and/or transmission and reception point TRP information.

In an embodiment, the CORESET information and/or TRP information is used to indicate a TRP corresponding to the first channel or the first RS; or the CORESET information and/or TRP information is used to indicate a TRP corresponding to the second channel or the second RS.

The network device provided in this embodiment of this application can implement the processes implemented by the network device in the foregoing method embodiment. To avoid repetition, details are not described herein again.

In this embodiment of this application, the network device updates, activates, or indicates the parameter information of the first channel or the first RS by using the MAC CE command, so that the terminal device can determine the parameter information of the second channel or the second RS that is under the preset condition, based on the parameter information of the first channel or the first RS. The preset condition includes at least one of the following: that at least one PUCCH resource group has been configured on at least one BWP; that a plurality of PUCCH resources have been configured in a multi-CC scenario; that a plurality of PUCCH resource groups have been configured in a multi-CC scenario; a multi-TRP scenario; that a plurality of CSI-RS resources or a plurality of SRS resources have been configured in a multi-CC scenario; that a plurality of PL RSs and a plurality of SRS resource sets have been configured in a multi-CC scenario; and that no PL RS for a PUCCH or an SRS resource set has been configured. Therefore, in this technical solution, the method for determining the parameter information of the second channel or the second RS under different conditions (scenarios) is improved, and only the parameter information of the first channel or the first RS needs to be updated, activated, or indicated by using the MAC CE command, thereby reducing signaling overheads and delays during configuration or indication of channel information.

Figure 3:
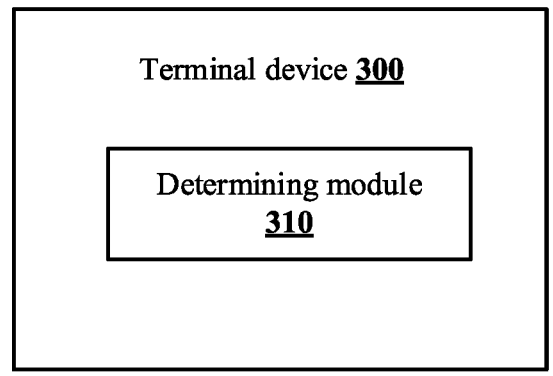
FIG. 3 is a schematic structural diagram of a terminal device according to an embodiment of this application.

FIG. 3 is a schematic structural diagram of a terminal device according to an embodiment of this application. Referring to FIG. 3, the terminal device 300 may include:
a determining module 310, configured to determine parameter information of a second channel or a second RS under a preset condition, based on parameter information of a first channel or a first reference signal RS, where the parameter information of the first channel or the first reference signal RS is updated, activated, or indicated by a network device by using a media access control MAC control element CE command.

The parameter information includes at least one of transmission configuration indicator TCI state information, spatial relation information, and path loss PL RS; and the preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

In an embodiment, the terminal device 300 further includes:
a receiving module, configured to: before the parameter information of the second channel or the second RS is determined under a preset condition, based on the parameter information of the first channel or the first reference signal RS, receive at least one common CC list that is configured for uplink and downlink by the network device by using RRC signaling, where CCs in the at least one common component carrier CC list are all in an activated state or a deactivated state.

In an embodiment, the CCs in the at least one common CC list are located in a same band or different bands.

In an embodiment, if the CCs are located in different bands, the CC list carries band information corresponding to the different bands.

In an embodiment, the parameter information includes the spatial relation information, the preset condition includes that at least one PUCCH resource group has been configured on at least one BWP, and PUCCH resources of each PUCCH resource group are located in a same bandwidth part BWP.

The determining module 310 is further configured to:
if spatial relation information of the first channel that is updated, activated, or indicated by using the MAC CE command is first spatial relation information, determine that spatial relation information of the second channel is the first spatial relation information.

In a case that the first channel includes a first PUCCH resource of a first PUCCH resource group on a first BWP, or that the first channel includes all PUCCH resources of the first PUCCH resource group on the first BWP, the second channel includes all the PUCCH resources of the first PUCCH resource group.

In an embodiment, the parameter information includes the spatial relation information, and the preset condition includes that a plurality of PUCCH resources have been configured in a multi-CC scenario.

The determining module 310 is further configured to:
if spatial relation information of the first channel that is updated, activated, or indicated by using the MAC CE command is second spatial relation information, determine that spatial relation information of the second channel is the second spatial relation information.

In a case that the first channel includes a second PUCCH resource on a second BWP of a first CC in a first CC list, the second channel includes a third PUCCH resource, where the third PUCCH resource includes at least one of the following: all PUCCH resources on all BWPs of at least one CC in the first CC list, PUCCH resources that have a same resource identifier as the second PUCCH resource and that are on all BWPs of at least one CC in the first CC list, all PUCCH resources on the first CC, and all PUCCH resources on the second BWP; or
in a case that the first channel includes PUCCH resources having a same first resource identifier on all BWPs of all CCs in the first CC list, the second channel includes the PUCCH resources having the first resource identifier on all the BWPs of all the CCs in the first CC list; or
in a case that the first channel includes all PUCCH resources on all BWPs of all CCs in the first CC list, the second channel includes all the PUCCH resources on all the BWPs of all the CCs in the first CC list.

In an embodiment, the parameter information includes the spatial relation information, and the preset condition includes that a plurality of PUCCH resource groups have been configured in a multi-CC scenario.

The determining module 310 is further configured to:
if spatial relation information of the first channel that is updated, activated, or indicated by using the MAC CE command is third spatial relation information, determine that spatial relation information of the second channel is the third spatial relation information.

In a case that the first channel includes all PUCCH resources of a second PUCCH resource group on a third BWP of a second CC in a second CC list, the second channel includes all PUCCH resources of a third PUCCH resource group, and the third PUCCH resource group includes at least one of the following: all PUCCH resource groups on all BWPs of at least one CC in the second CC list, PUCCH resource groups that have a same resource group identifier as the second PUCCH resource group and that are on all BWPs of at least one CC in the second CC list, all PUCCH resource groups on the second CC, and all PUCCH resource groups on the third BWP; or
in a case that the first channel includes all PUCCH resources of PUCCH resource groups having a same first resource group identifier on all BWPs of all CCs in the second CC list, the second channel includes all PUCCH resources of the PUCCH resource groups having the first resource group identifier on all the BWPs of all the CCs in the second CC list; or
in a case that the first channel includes all PUCCH resources of all PUCCH resource groups on all BWPs of all CCs in the second CC list, the second channel includes all the PUCCH resources of all the PUCCH resource groups on all the BWPs of all the CCs in the second CC list.

In an embodiment, the parameter information includes the spatial relation information, the preset condition includes that a plurality of SRS resources have been configured in a multi-CC scenario, and the SRS resources are semi-persistent or aperiodic SRS resources.

The determining module 310 is further configured to:
if spatial relation information of the first RS resource that is updated, activated, or indicated by using the MAC CE command is fourth spatial relation information, determine that spatial relation information of the second RS is the fourth spatial relation information.

In a case that the first RS includes a first SRS resource on a fourth BWP of a third CC in a third CC list, the second RS includes all SRS resources that have a same resource identifier as the first SRS resource and that are on all BWPs of at least one CC in the third CC list; or
in a case that the first RS includes SRS resources having a same second resource identifier on all BWPs of all CCs in the third CC list, the second RS includes the SRS resources having the second resource identifier on all the BWPs of all the CCs in the third CC list; or
in a case that the first RS includes all SRS resources on all the BWPs of all the CCs in the third CC list, the second RS includes all the SRS resources on all the BWPs of all the CCs in the third CC list; where
a parameter usage of an SRS resource set to which the first SRS resource belongs is configured to be codebook codebook, noncodebook nonCodebook, or antenna switching antennaSwitching.

In an embodiment, the parameter information includes the TCI state information, the preset condition includes that a plurality of CSI-RS resources have been configured in a multi-CC scenario, and each of the CSI-RS resources is a semi-persistent or aperiodic CSI-RS resource.

The determining module 310 is further configured to:
if TCI state information of the first RS resource that is updated, activated, or indicated by using the MAC CE command is first TCI state information, determine that TCI state information of the second RS resource is the first TCI state information.

In a case that the first RS includes a first CSI-RS resource on a fifth BWP of a fourth CC in a fourth CC list, the second RS includes second CSI-RS resources that have a same CSI-RS resource identifier as the first CSI-RS resource and that are on all BWPs of at least one CC in the fourth CC list; or
in a case that the first RS includes CSI-RS resources having a same third resource identifier on all the BWPs of all the CCs in the fourth CC list, the second RS includes the CSI-RS resources having the third resource identifier on all the BWPs of all the CCs in the fourth CC list; or in a case that the first RS includes all CSI-RS resources on all the BWPs of all the CCs in the fourth CC list, the second RS includes all the CSI-RS resources on all the BWPs of all the CCs in the fourth CC list; where the CSI-RS resource is configured for measuring at least one of the following: channel state information CSI, channel quality indication CQI, precoding matrix indicator PMI, rank indicator RI, and beam failure detection.

In an embodiment, the parameter information includes the PL RS, and the preset condition includes that a plurality of PL RSs and a plurality of channel sounding reference signal SRS resource sets have been configured in a multi-CC scenario.

The determining module 310 is further configured to:
if a PL RS of the first RS that is updated, activated, or indicated by using the MAC CE command is a first PL RS, determine that a PL RS of the second RS is the first PL RS, or determine that a PL RS identifier corresponding to the PL RS of the second RS is a PL RS identifier corresponding to the first PL RS.

In a case that the first RS includes a first SRS resource set on a sixth BWP of a fifth CC in a fifth CC list, the second RS includes a second SRS resource set, where the second SRS resource set includes at least one of the following: SRS resource sets that have a same SRS resource set identifier as the first SRS resource set and that are on all BWPs of at least one CC in the fifth CC list, SRS resource sets that have at least one same SRS resource as the first SRS resource set and that are on all BWPs of at least one CC in the fifth CC list, and all SRS resource sets on all BWPs of at least one CC of the fifth CC list; or in a case that the first RS includes SRS resource sets having a same first resource set identifier on all the BWPs of all the CCs in the fifth CC list, the second RS includes the SRS resource sets having the first resource set identifier on all the BWPs of all the CCs in the fifth CC list; or in a case that the first RS includes all SRS resource sets on all the BWPs of all the CCs in the fifth CC list, the second RS includes all the SRS resource sets on all the BWPs of all the CCs in the fifth CC list.

In an embodiment, the determining module 310 is further configured to:
in a case that the number of PL RSs configured for the terminal device by the network device is less than or equal to a preset threshold, determine that the MAC CE takes effect on at least one of the following occasions:
when the MAC CE is received;
when first duration elapses after the MAC CE is received;
when confirmation information for the MAC CE is sent;
when third duration elapses after the confirmation information for the MAC CE is sent;
when the confirmation information is received by the network device; and
when second duration elapses after the confirmation information is received by the network device.

In an embodiment, the terminal device 300 further includes:
a tracking and measuring module, configured to: in a case that the number of configured PL RSs is less than or equal to the preset threshold, keep tracking and measuring all PL RSs configured by the network device.

In an embodiment, the parameter information includes the PL RS, and the preset condition includes that no PL RS for a physical uplink control channel PUCCH or for an SRS resource set has been configured.

The determining module 310 is further configured to:
determine a PL RS of the second channel or the second RS to be a DL RS out of a plurality of downlink DL RSs that is indicated by using the MAC CE command; where
the first channel includes a PUCCH, or the first RS includes an SRS resource set;
the second channel includes the PUCCH, or the second RS includes the SRS resource set; and
the plurality of DL RSs include at least one of the following: a DL RS in spatial relation information of the PUCCH or an SRS resource in the SRS resource set, a DL RS associated with spatial relation information of the PUCCH or an SRS resource in the SRS resource set, and a DL RS in TCI state information of a preset downlink channel; where the preset downlink channel is a downlink channel determined according to a preset rule.

In an embodiment, the second channel is an uplink channel or the second RS is an uplink RS, the parameter information is the spatial relation information or the PL RS, and each CC in the CC list is a CC having an uplink; and
the CC having an uplink includes at least one of the following:
a CC having an uplink slot and/or uplink symbol that is configured by using RRC signaling;
a CC having an uplink slot and/or uplink symbol that is indicated by downlink control information DCI; and
a CC that is configured by using RRC signaling to be between a first parameter and a second parameter and that is indicated by DCI to be a CC with an uplink slot and/or uplink symbol, where the first parameter includes a downlink slot and/or a downlink symbol, and the second parameter includes an uplink slot and/or an uplink symbol.

In an embodiment, the second channel includes a first associated channel, or the second RS includes a first associated RS; the preset condition includes a multi-TRP scenario; and the MAC CE command carries control resource set CORESET information and/or transmission and reception point TRP information.

The determining module 310 is further configured to:
determine parameter information of the first associated channel or the first associated RS as the parameter information of the first channel or the first RS; where
the first associated channel includes at least one of the following: a channel corresponding to the CORESET information, a channel corresponding to a TRP that is associated with the CORESET information, and a channel corresponding to a TRP that is corresponding to the TRP information; and
the first associated RS includes at least one of the following: an RS corresponding to the CORESET information, an RS corresponding to a TRP that is associated with the CORESET information, and an RS corresponding to a TRP that is corresponding to the TRP information.

In an embodiment, the CORESET information and/or TRP information is used to indicate a TRP corresponding to the first channel or the first RS; or the CORESET information and/or TRP information is used to indicate a TRP corresponding to the second channel or the second RS.

In an embodiment, the first channel and the first associated channel correspond to same CORESET information and/or TRP information; and the first RS and the first associated RS correspond to same CORESET information and/or TRP information.

The terminal device provided in this embodiment of this application is capable of implementing the processes that are implemented by the terminal device in the foregoing method embodiments. To avoid repetition, details are not described herein again.

In this embodiment of this application, the network device updates, activates, or indicates the parameter information of the first channel or the first RS by using the MAC CE command, so that the terminal device can determine the parameter information of the second channel or the second RS that is under the preset condition, based on the parameter information of the first channel or the first RS. The preset condition includes at least one of the following: that at least one PUCCH resource group has been configured on at least one BWP; that a plurality of PUCCH resources have been configured in a multi-CC scenario; that a plurality of PUCCH resource groups have been configured in a multi-CC scenario; a multi-TRP scenario; that a plurality of CSI-RS resources or a plurality of SRS resources have been configured in a multi-CC scenario; that a plurality of PL RSs and a plurality of SRS resource sets have been configured in a multi-CC scenario; and that no PL RS for a PUCCH or an SRS resource set has been configured. Therefore, in this technical solution, the method for determining the parameter information of the second channel or the second RS under different conditions (scenarios) is improved, and only the parameter information of the first channel or the first RS needs to be updated, activated, or indicated by using the MAC CE command, thereby reducing signaling overheads and delays during configuration or indication of channel information.

Figure 4:
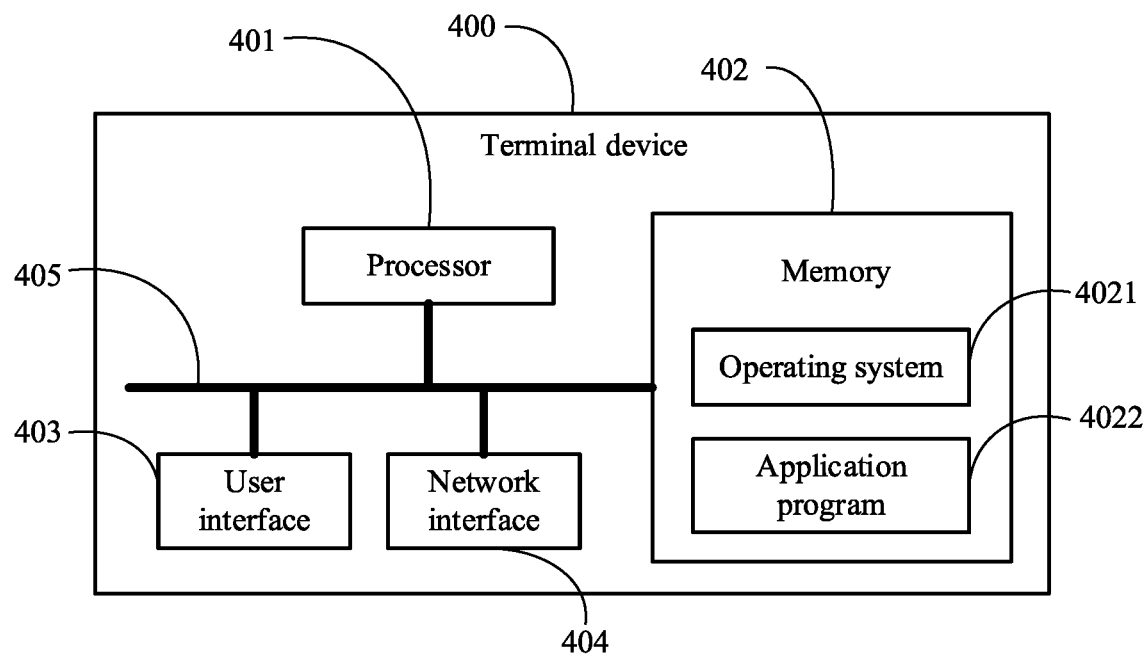
FIG. 4 is a schematic structural diagram of a terminal device according to another embodiment of this application.

FIG. 4 is a block diagram of a terminal device according to another embodiment of this application. The terminal device 400 shown in FIG. 4 includes at least one processor 401, a memory 402, at least one network interface 404, and a user interface 403. The components of the terminal device 400 are coupled together by using the bus system 405. It can be understood that the bus system 405 is configured to implement connection communication between these components. The bus system 405 may include not only a data bus but also a power supply bus, a control bus, and a status signal bus. However, for clear description, various buses in FIG. 4 are marked as the bus system 405.

The user interface 403 may include a display, a keyboard, or a click device, for example, a mouse, a trackball, a touch board, or a touchscreen.

It can be understood that the memory 402 in this embodiment of this application may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and serves as an external cache. For illustrative rather than limitative description, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct memory bus random access memory (Direct Rambus RAM, DRRAM). The memory 402 in the system and method described in the embodiments of this application is intended to include but is not limited to these and any other suitable types of memories.

In some implementations, the memory 402 stores the following elements: an executable module or a data structure, or a subset thereof, or an extended set thereof: an operating system 4021 and an application program 4022.

The operating system 4021 includes various system programs, such as a framework layer, a kernel library layer, and a driver layer, and is configured to implement various basic services and process hardware-based tasks. The application program 4022 includes various application programs, such as a media player, and a browser, and is configured to implement various application services. A program that implements the methods of the embodiments of this disclosure may be included in the application program 4022.

In this embodiment of this application, the terminal device 400 further includes a computer program stored in the memory 409 and capable of running on the processor 410. When the computer program is executed by the processor 401, the following step is implemented:

determining parameter information of a second channel or a second RS under a preset condition, based on parameter information of a first channel or a first reference signal RS, where the parameter information of the first channel or the first reference signal RS is updated, activated, or indicated by a network device by using a media access control MAC control element CE command.

The parameter information includes at least one of transmission configuration indicator TCI state information, spatial relation information, and path loss PL RS; and the preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

The methods disclosed in the embodiments of this application may be applied to the processor 401, or implemented by the processor 401. The processor 401 may be an integrated circuit chip with a signal processing capability. In an implementation process, the steps of the methods may be implemented by an integrated logic circuit of hardware in the processor 401, or by a software instruction. The processor 401 may be a general purpose processor, a digital signal processor (DSP), an application-specific integrated circuit (ASIC), a field programmable gate array (FPGA) or another programmable logic device, a discrete gate or transistor logic device, or a discrete hardware component, and the processor may implement or execute methods, steps and logical block diagrams disclosed in the embodiments of this application. The general-purpose processor may be a microprocessor or any regular processor. The steps of the methods disclosed with reference to the embodiments of this application may be directly implemented by a hardware decoding processor, or may be implemented by a combination of hardware and a software module in a decoding processor. The software module may be located in a computer readable storage medium that is mature in the art, such as a random access memory, a flash memory, a read-only memory, a programmable read-only memory, or an electrically erasable programmable memory, or a register. The computer readable storage medium is located in the memory 402, and the processor 401 reads information in the memory 402 and implements, in combination with its hardware, the steps of the foregoing methods. Specifically, a computer program is stored in the computer-readable storage medium, and when the computer program is executed by the processor 401, the steps of the foregoing channel information determining method embodiments are implemented.

It can be understood that the embodiments described in this application may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, and other electronic units for performing the functions described in this application, or a combination thereof.

For software implementation, the techniques described in the embodiments of this application may be implemented by modules (such as processes and functions) that perform the functions described in the embodiments of this application. Software code may be stored in the memory and executed by the processor. The memory may be implemented in or outside the processor.

Optionally, when the computer program is executed by the processor 401, the following step may be further implemented:
before the determining parameter information of a second channel or a second RS under a preset condition, based on parameter information of a first channel or a first reference signal RS, receiving at least one common CC list that is configured for uplink and downlink by the network device by using RRC signaling, where CCs in the at least one common component carrier CC list are all in an activated state or a deactivated state.

Optionally, the CCs in the at least one common CC list are located in a same band or different bands.

Optionally, if the CCs are located in different bands, the CC list carries band information corresponding to the different bands.

Optionally, the parameter information includes the spatial relation information, the preset condition includes that at least one PUCCH resource group has been configured on at least one BWP, and PUCCH resources of each PUCCH resource group are located in a same bandwidth part BWP.

When the computer program is executed by the processor 401, the following step may be further implemented:
if spatial relation information of the first channel that is updated, activated, or indicated by using the MAC CE command is first spatial relation information, determining that spatial relation information of the second channel is the first spatial relation information.

In a case that the first channel includes a first PUCCH resource of a first PUCCH resource group on a first BWP, or that the first channel includes all PUCCH resources of the first PUCCH resource group on the first BWP, the second channel includes all the PUCCH resources of the first PUCCH resource group.

Optionally, the parameter information includes the spatial relation information, and the preset condition includes that a plurality of PUCCH resources have been configured in a multi-CC scenario.

When the computer program is executed by the processor 401, the following step may be further implemented:
if spatial relation information of the first channel that is updated, activated, or indicated by using the MAC CE command is second spatial relation information, determining that spatial relation information of the second channel is the second spatial relation information.

In a case that the first channel includes a second PUCCH resource on a second BWP of a first CC in a first CC list, the second channel includes a third PUCCH resource, where the third PUCCH resource includes at least one of the following: all PUCCH resources on all BWPs of at least one CC in the first CC list, PUCCH resources that have a same resource identifier as the second PUCCH resource and that are on all BWPs of at least one CC in the first CC list, all PUCCH resources on the first CC, and all PUCCH resources on the second BWP; or
in a case that the first channel includes PUCCH resources having a same first resource identifier on all BWPs of all CCs in the first CC list, the second channel includes the PUCCH resources having the first resource identifier on all the BWPs of all the CCs in the first CC list; or
in a case that the first channel includes all PUCCH resources on all BWPs of all CCs in the first CC list, the second channel includes all the PUCCH resources on all the BWPs of all the CCs in the first CC list.

Optionally, the parameter information includes the spatial relation information, and the preset condition includes that a plurality of PUCCH resource groups have been configured in a multi-CC scenario.

When the computer program is executed by the processor 401, the following step may be further implemented:
if spatial relation information of the first channel that is updated, activated, or indicated by using the MAC CE command is third spatial relation information, determining that spatial relation information of the second channel is the third spatial relation information.

In a case that the first channel includes all PUCCH resources of a second PUCCH resource group on a third BWP of a second CC in a second CC list, the second channel includes all PUCCH resources of a third PUCCH resource group, and the third PUCCH resource group includes at least one of the following: all PUCCH resource groups on all BWPs of at least one CC in the second CC list, PUCCH resource groups that have a same resource group identifier as the second PUCCH resource group and that are on all BWPs of at least one CC in the second CC list, all PUCCH resource groups on the second CC, and all PUCCH resource groups on the third BWP; or
in a case that the first channel includes all PUCCH resources of PUCCH resource groups having a same first resource group identifier on all BWPs of all CCs in the second CC list, the second channel includes all PUCCH resources of the PUCCH resource groups having the first resource group identifier on all the BWPs of all the CCs in the second CC list; or in a case that the first channel includes all PUCCH resources of all PUCCH resource groups on all BWPs of all CCs in the second CC list, the second channel includes all the PUCCH resources of all the PUCCH resource groups on all the BWPs of all the CCs in the second CC list.

Optionally, the parameter information includes the spatial relation information, the preset condition includes that a plurality of SRS resources have been configured in a multi-CC scenario, and the SRS resources are semi-persistent or aperiodic SRS resources.

When the computer program is executed by the processor 401, the following step may be further implemented:

if spatial relation information of the first RS that is updated, activated, or indicated by using the MAC CE command is fourth spatial relation information, determining that spatial relation information of the second RS is the fourth spatial relation information.

In a case that the first RS includes a first SRS resource on a fourth BWP of a third CC in a third CC list, the second RS includes all SRS resources that have a same resource identifier as the first SRS resource and that are on all BWPs of at least one CC in the third CC list; or in a case that the first RS includes SRS resources having a same second resource identifier on all BWPs of all CCs in the third CC list, the second RS includes the SRS resources having the second resource identifier on all the BWPs of all the CCs in the third CC list; or in a case that the first RS includes all SRS resources on all the BWPs of all the CCs in the third CC list, the second RS includes all the SRS resources on all the BWPs of all the CCs in the third CC list; and a parameter usage of an SRS resource set to which the first SRS resource belongs is configured to be codebook codebook, non-codebook nonCodebook, or antenna switching antennaSwitching.

Optionally, the parameter information includes the TCI state information, the preset condition includes that a plurality of CSI-RS resources have been configured in a multi-CC scenario, and each of the CSI-RS resources is a semi-persistent or aperiodic CSI-RS resource.

When the computer program is executed by the processor 401, the following step may be further implemented:

if TCI state information of the first RS that is updated, activated, or indicated by using the MAC CE command is first TCI state information, determining that TCI state information of the second RS is the first TCI state information.

In a case that the first RS includes a first CSI-RS resource on a fifth BWP of a fourth CC in a fourth CC list, the second RS includes second CSI-RS resources that have a same CSI-RS resource identifier as the first CSI-RS resource and that are on all BWPs of at least one CC in the fourth CC list; or in a case that the first RS includes CSI-RS resources having a same third resource identifier on all the BWPs of all the CCs in the fourth CC list, the second RS includes the CSI-RS resources having the third resource identifier on all the BWPs of all the CCs in the fourth CC list; or in a case that the first RS includes all CSI-RS resources on all the BWPs of all the CCs in the fourth CC list, the second RS includes all the CSI-RS resources on all the BWPs of all the CCs in the fourth CC list; where the CSI-RS resource is configured for measuring at least one of the following: channel state information CSI, channel quality indication CQI, precoding matrix indicator PMI, rank indicator RI, and beam failure detection.

Optionally, the parameter information includes the PL RS, and the preset condition includes that a plurality of PL RSs and a plurality of channel sounding reference signal SRS resource sets have been configured in a multi-CC scenario.

When the computer program is executed by the processor 401, the following step may be further implemented:

if a PL RS of the first RS that is updated, activated, or indicated by using the MAC CE command is a first PL RS, determining that a PL RS of the second RS is the first PL RS, or determining that a PL RS identifier corresponding to the PL RS of the second RS is a PL RS identifier corresponding to the first PL RS.

In a case that the first RS includes a first SRS resource set on a sixth BWP of a fifth CC in a fifth CC list, the second RS includes a second SRS resource set, where the second SRS resource set includes at least one of the following: SRS resource sets that have a same SRS resource set identifier as the first SRS resource set and that are on all BWPs of at least one CC in the fifth CC list, SRS resource sets that have at least one same SRS resource as the first SRS resource set and that are on all BWPs of at least one CC in the fifth CC list, and all SRS resource sets on all BWPs of at least one CC of the fifth CC list; or in a case that the first RS includes SRS resource sets having a same first resource set identifier on all the BWPs of all the CCs in the fifth CC list, the second RS includes the SRS resource sets having the first resource set identifier on all the BWPs of all the CCs in the fifth CC list; or in a case that the first RS includes all SRS resource sets on all the BWPs of all the CCs in the fifth CC list, the second RS includes all the SRS resource sets on all the BWPs of all the CCs in the fifth CC list.

Optionally, when the computer program is executed by the processor 401, the following step may be further implemented:

in a case that the number of PL RSs configured for the terminal device by the network device is less than or equal to a preset threshold, determining that the MAC CE takes effect on at least one of the following occasions:

when the MAC CE is received;

when first duration elapses after the MAC CE is received;

when confirmation information for the MAC CE is sent;

when third duration elapses after the confirmation information for the MAC CE is sent;

when the confirmation information is received by the network device; and when second duration elapses after the confirmation information is received by the network device.

Optionally, when the computer program is executed by the processor 401, the following step may be further implemented:

in a case that the number of configured PL RSs is less than or equal to the preset threshold, keeping tracking and measuring all PL RSs configured by the network device.

Optionally, the parameter information includes the PL RS, and the preset condition includes that no PL RS for a physical uplink control channel PUCCH or for an SRS resource set has been configured.

When the computer program is executed by the processor 401, the following step may be further implemented:

determining a PL RS of the second channel or the second RS to be a DL RS out of a plurality of downlink DL RSs that is indicated by using the MAC CE command; where the first channel includes a PUCCH, or the first RS includes an SRS resource set;

the second channel includes the PUCCH, or the second RS includes the SRS resource set; and the plurality of DL RSs include at least one of the following: a DL RS in spatial relation information of the PUCCH or an SRS resource in the SRS resource set, a DL RS associated with spatial relation information of the PUCCH or an SRS resource in the SRS resource set, and a DL RS in TCI state information of a preset downlink channel; where the preset downlink channel is a downlink channel determined according to a preset rule.

Optionally, the second channel is an uplink channel or the second RS is an uplink RS, the parameter information is the spatial relation information or the PL RS, and each CC in the CC list is a CC having an uplink; and the CC having an uplink includes at least one of the following:

a CC having an uplink slot and/or uplink symbol that is configured by using RRC signaling;

a CC having an uplink slot and/or uplink symbol that is indicated by downlink control information DCI; and a CC that is configured by using RRC signaling to be between a first parameter and a second parameter and that is indicated by DCI to be a CC with an uplink slot and/or uplink symbol, where the first parameter includes a downlink slot and/or a downlink symbol, and the second parameter includes an uplink slot and/or an uplink symbol.

Optionally, the second channel includes a first associated channel, or the second RS includes a first associated RS; and the preset condition includes a multi-TRP scenario, and the MAC CE command carries control resource set CORESET information and/or transmission and reception point TRP information.

When the computer program is executed by the processor 401, the following step may be further implemented:

determining parameter information of the first associated channel or the first associated RS as the parameter information of the first channel or the first RS; where the first associated channel includes at least one of the following: a channel corresponding to the CORESET information, a channel corresponding to a TRP that is associated with the CORESET information, and a channel corresponding to a TRP that is corresponding to the TRP information; and the first associated RS includes at least one of the following: an RS corresponding to the CORESET information, an RS corresponding to a TRP that is associated with the CORESET information, and an RS corresponding to a TRP that is corresponding to the TRP information.

Optionally, the CORESET information and/or TRP information is used to indicate a TRP corresponding to the first channel or the first RS; or the CORESET information and/or TRP information is used to indicate a TRP corresponding to the second channel or the second RS.

Optionally, the first channel and the first associated channel correspond to same CORESET information and/or TRP information; and the first RS and the first associated RS correspond to same CORESET information and/or TRP information.

The terminal device 400 is capable of implementing the processes implemented by the terminal device in the foregoing embodiments, with the same effects achieved. To avoid repetition, details are not described herein again.

In this embodiment of this application, the network device updates, activates, or indicates the parameter information of the first channel or the first RS by using the MAC CE command, so that the terminal device can determine the parameter information of the second channel or the second RS that is under the preset condition, based on the parameter information of the first channel or the first RS. The preset condition includes at least one of the following: that at least one PUCCH resource group has been configured on at least one BWP; that a plurality of PUCCH resources have been configured in a multi-CC scenario; that a plurality of PUCCH resource groups have been configured in a multi-CC scenario; a multi-TRP scenario; that a plurality of CSI-RS resources or a plurality of SRS resources have been configured in a multi-CC scenario; that a plurality of PL RSs and a plurality of SRS resource sets have been configured in a multi-CC scenario; and that no PL RS for a PUCCH or an SRS resource set has been configured. Therefore, in this technical solution, the method for determining the parameter information of the second channel or the second RS under different conditions (scenarios) is improved, and only the parameter information of the first channel or the first RS needs to be updated, activated, or indicated by using the MAC CE command, thereby reducing signaling overheads and delays during configuration or indication of channel information.

Figure 5:
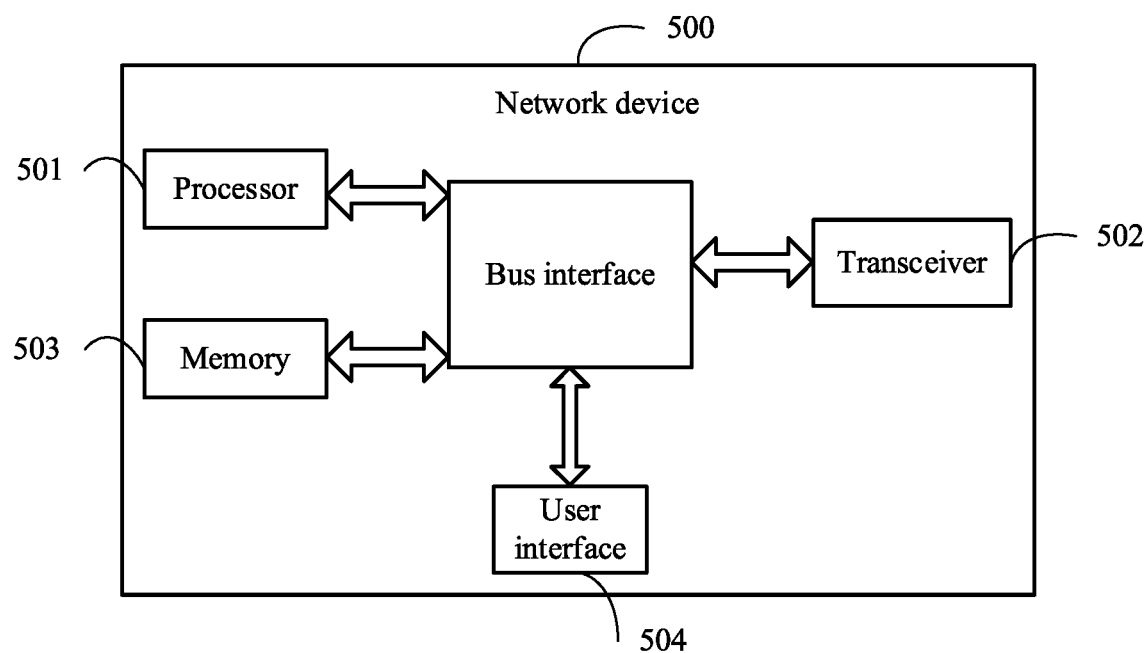
FIG. 5 is a schematic structural diagram of a network device according to another embodiment of this application.

Referring to FIG. 5, FIG. 5 is a structural diagram of a network device to which an embodiment of this application is applied. Details of the channel information determining method executed by the network device in the foregoing embodiments can be implemented, with the same effects achieved. As shown in FIG. 5, the network device 500 includes a processor 501, a transceiver 502, a memory 503, a user interface 504, and a bus interface.

In this embodiment of this application, the network device 500 further includes a computer program stored in the memory 503 and capable of running on the processor 501. When the computer program is executed by the processor 501, the following steps are implemented:

updating, activating, or indicating parameter information of a first channel or a first reference signal RS by using a media access control MAC control element CE command, where the parameter information of the first channel or the first reference signal RS is used for determining the parameter information of a second channel or a second RS under a preset condition.

The parameter information includes at least one of transmission configuration indicator TCI state information, spatial relation information, and path loss PL RS; and the preset condition includes at least one of the following: that at least one physical uplink control channel PUCCH resource group has been configured on at least one bandwidth part BWP; that a plurality of PUCCH resources have been configured in a multi-CC scenario; that a plurality of PUCCH resource groups have been configured in a multi-CC scenario; a multi-transmission and reception point TRP scenario; that a plurality of channel state information reference signal CSI-RS resources or a plurality of channel sounding reference signal SRS resources have been configured in a multi-CC scenario; that a plurality of PL RSs and a plurality of SRS resource sets have been configured in a multi-CC scenario; and that no PL RS for a physical uplink control channel PUCCH or for an SRS resource set has been configured.

In FIG. 5, a bus architecture may include any quantity of interconnected buses and bridges, and specifically connects together circuits that are of one or more processors represented by the processor 501 and of a memory represented by the memory 503. The bus architecture may further interconnect various other circuits such as a peripheral device, a voltage regulator, and a power management circuit. These are all well known in the art, and therefore are not further described in this specification. The bus interface provides an interface. The transceiver 502 may be a plurality of components, including a transmitter and a receiver, and provides units for communicating with a variety of other apparatuses on a transmission medium. For different user equipments, the user interface 504 may also be an interface that can be externally or internally connected to a required device. The connected device includes but is not limited to a keypad, a display, a speaker, a microphone, a joystick, and the like.

The processor 501 is responsible for management of the bus architecture and general processing, and the memory 503 is capable of storing data that is used by the processor 501 during operation.

Optionally, when the computer program is executed by the processor 501, the following step may be further implemented:
before updating, activating, or indicating parameter information of a first channel or a first reference signal RS by using a media access control MAC control element CE, configuring at least one common component carrier CC list for uplink and downlink by using radio resource control RRC signaling, where each CC in the at least one common CC list is in an activated state or a deactivated state.

Optionally, the CCs in the at least one common CC list are located in a same band or different bands.

Optionally, if the CCs are located in different bands, the CC list carries band information corresponding to the different bands.

Optionally, the first channel includes a first PUCCH resource of a first PUCCH resource group on a first BWP, or the first channel includes all PUCCH resources of the first PUCCH resource group on the first BWP.

The parameter information includes the spatial relation information, the preset condition includes that at least one PUCCH resource group has been configured on at least one bandwidth part BWP, and PUCCH resources of each PUCCH resource group are located in a same bandwidth part BWP.

When the computer program is executed by the processor 501, the following step may be further implemented:
updating, activating, or indicating spatial relation information of the first channel as first spatial relation information by using the MAC CE command.

Optionally, the first channel includes a second PUCCH resource on a second BWP of a first CC in a first CC list, or the first channel includes PUCCH resources having a same first resource identifier on all BWPs of all CCs in the first CC list, or the first channel includes all PUCCH resources on all the BWPs of all the CCs in the first CC list.

The parameter information includes the spatial relation information, and the preset condition includes that a plurality of PUCCH resources have been configured in a multi-CC scenario.

When the computer program is executed by the processor 501, the following step may be further implemented:
updating, activating, or indicating, by using the MAC CE command, spatial relation information of the first channel as second spatial relation information.

Optionally, the first channel includes all PUCCH resources of a second PUCCH resource group on a third BWP of a second CC in a second CC list, or the first channel includes all PUCCH resources of PUCCH resource groups having a same first resource group identifier on all BWPs of all CCs in the second CC list; or, the first channel includes all PUCCH resources of all PUCCH resource groups on all the BWPs of all the CCs in the second CC list.

The parameter information includes the spatial relation information, and the preset condition includes that a plurality of PUCCH resource groups have been configured in a multi-CC scenario.

When the computer program is executed by the processor 501, the following step may be further implemented:
updating, activating, or indicating, by using the MAC CE command, spatial relation information of the first channel as third spatial relation information.

Optionally, the first RS includes a first SRS resource on a fourth BWP of a third CC in a third CC list, or the first RS includes SRS resources having a same second resource identifier on all BWPs of all CCs in the third CC list, or the first RS includes all SRS resources on all the BWPs of all the CCs in the third CC list.

The parameter information includes the spatial relation information, the preset condition includes that a plurality of SRS resources have been configured in a multi-CC scenario, and the SRS resources are semi-persistent or aperiodic SRS resources.

When the computer program is executed by the processor 501, the following step may be further implemented:
updating, activating, or indicating, by using the MAC CE command, spatial relation information of the first RS as fourth spatial relation information; where
a parameter usage of an SRS resource set to which the first SRS resource belongs is configured to be codebook codebook, noncodebook nonCodebook, or antenna switching antennaSwitching.

Optionally, a source RS in spatial relation information of each of the SRS resources is configured to be a downlink DL RS.

Optionally, the first channel is an uplink channel, or the first RS is an uplink RS. When the computer program is executed by the processor 501, the following step may be further implemented:
configuring a same source RS for same spatial relation information of the uplink channel or uplink RS.

Optionally, the first RS includes a first CSI-RS resource on a fifth BWP of a fourth CC in a fourth CC list, or the first RS includes CSI-RS resources having a same third resource identifier on all BWPs of all CCs in the fourth CC list, or the first RS includes all CSI-RS resources on all the BWPs of all the CCs in the fourth CC list.

The parameter information includes the TCI state information, the preset condition includes that a plurality of CSI-RS resources have been configured in a multi-CC scenario, and each of the CSI-RS resources is a semi-persistent or aperiodic CSI-RS resource.

When the computer program is executed by the processor 501, the following step may be further implemented:
updating, activating, or indicating TCI state information of the first RS resource as first TCI state information by using the MAC CE command.

Optionally, the CSI-RS resource is configured for measuring at least one of the following: channel state information CSI, channel quality indication CQI, precoding matrix indicator PMI, rank indicator RI, and beam failure detection.

Optionally, the parameter information includes the TCI state information.

When the computer program is executed by the processor 501, the following step may be further implemented:
with regard to TCI states with a same TCI state identifier, configuring same quasi-colocation type QCL-TypeD RSs for the TCI states for different cell identifiers, and configuring same or different QCL-TypeA RSs and QCL-TypeD RSs for the TCI states for a same cell identifier.

Optionally, the first RS includes a first SRS resource set on a sixth BWP of a fifth CC in a fifth CC list, or the first RS includes SRS resource sets having a same first resource set identifier on all BWPs of all CCs in the fifth CC list, or the first RS includes all SRS resource sets on all the BWPs of all the CCs in the fifth CC list.

The parameter information includes the PL RS, and the preset condition includes that a plurality of PL RSs and a plurality of channel sounding reference signal SRS resource sets have been configured in a multi-CC scenario.

When the computer program is executed by the processor 501, the following step may be further implemented:

Optionally, when the computer program is executed by the processor 501, the following step may be further implemented:
updating, activating, or indicating a PL RS of the first RS as a first PL RS by using the MAC CE command.

Optionally, the first channel includes a physical uplink control channel PUCCH, or the first RS includes an SRS resource set.

The parameter information includes the PL RS, and the preset condition includes that no PL RS for a physical uplink control channel PUCCH or for an SRS resource set has been configured.

When the computer program is executed by the processor 501, the following step may be further implemented:
indicating one DL RS out of a plurality of DL RSs by using the MAC CE command; where
the plurality of DL RSs include at least one of the following: a DL RS in spatial relation information of the PUCCH or an SRS resource in the SRS resource set, a DL RS associated with spatial relation information of the PUCCH or an SRS resource in the SRS resource set, and a DL RS in TCI state information of a preset downlink channel; where the preset downlink channel is a downlink channel determined according to a preset rule.

Optionally, the preset condition includes a multi-TRP scenario, and the MAC CE command carries control resource set CORESET information and/or transmission and reception point TRP information.

Optionally, the CORESET information and/or TRP information is used to indicate a TRP corresponding to the first channel or the first RS; or the CORESET information and/or TRP information is used to indicate a TRP corresponding to the second channel or the second RS.

In this embodiment of this application, the network device updates, activates, or indicates the parameter information of the first channel or the first RS by using the MAC CE command, so that the terminal device can determine the parameter information of the second channel or the second RS that is under the preset condition, based on the parameter information of the first channel or the first RS. The preset condition includes at least one of the following: that at least one PUCCH resource group has been configured on at least one BWP; that a plurality of PUCCH resources have been configured in a multi-CC scenario; that a plurality of PUCCH resource groups have been configured in a multi-CC scenario; a multi-TRP scenario; that a plurality of CSI-RS resources or a plurality of SRS resources have been configured in a multi-CC scenario; that a plurality of PL RSs and a plurality of SRS resource sets have been configured in a multi-CC scenario; and that no PL RS for a PUCCH or an SRS resource set has been configured. Therefore, in this technical solution, the method for determining the parameter information of the second channel or the second RS under different conditions (scenarios) is improved, and only the parameter information of the first channel or the first RS needs to be updated, activated, or indicated by using the MAC CE command, thereby reducing signaling overheads and delays during configuration or indication of channel information.

Optionally, an embodiment of this application further provides a network device, including a processor, a memory, and a computer program stored in the memory and capable of running on the processor. When the computer program is executed by the processor, the processes of the foregoing embodiment of the channel information determining method are implemented, with the same technical effects achieved. To avoid repetition, details are not described again herein.

Optionally, an embodiment of this application further provides a terminal device, including a processor, a memory, and a computer program stored in the memory and capable of running on the processor. When the computer program is executed by the processor, the processes of the foregoing embodiment of the channel information determining method are implemented, with the same technical effects achieved. To avoid repetition, details are not described again herein.

An embodiment of this application further provides a computer-readable storage medium, where a computer program is stored in the computer-readable storage medium. When the computer program is executed by a processor, the processes of the foregoing channel information determining method embodiment can be implemented, with the same technical effects achieved. To avoid repetition, details are not described herein again. The computer readable storage medium is, for example, a read-only memory (ROM for short), a random access memory (RAM for short), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . ." does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A channel information determining method, comprising:
    determining, by a terminal device, parameter information of a second channel or a second RS under a preset condition, based on parameter information of a first channel or a first RS, wherein the parameter information of the first channel or the first RS is updated, activated, or indicated by a network device by using a MAC CE command; wherein
    the parameter information comprises spatial relation information; and
    the preset condition comprises that at least one PUCCH resource group has been configured on at least one BWP;
    wherein PUCCH resources of each PUCCH resource group are located in a same BWP; and
    the determining, by a terminal device, parameter information of a second channel or a second RS under a preset condition, based on parameter information of a first channel or a first RS comprises:
    if spatial relation information of the first channel that is updated, activated, or indicated by using the MAC CE command is first spatial relation information, determining, by the terminal device, that spatial relation information of the second channel is the first spatial relation information, wherein
    in a case that the first channel comprises a first PUCCH resource of a first PUCCH resource group on a first BWP, or that the first channel comprises all PUCCH resources of the first PUCCH resource group on the first BWP, the second channel comprises all the PUCCH resources of the first PUCCH resource group.

2. The method according to claim 1, wherein the parameter information comprises the spatial relation information, the preset condition further comprises that a plurality of SRS resources have been configured in a multi-CC scenario, and the SRS resources are semi-persistent or aperiodic SRS resources; and
    the determining, by a terminal device, parameter information of a second channel or a second RS under a preset condition, based on parameter information of a first channel or a first RS comprises:
    if spatial relation information of the first RS that is updated, activated, or indicated by using the MAC CE command is fourth spatial relation information, determining, by the terminal device, that spatial relation information of the second RS is the fourth spatial relation information, wherein
    in a case that the first RS comprises a first SRS resource on a fourth BWP of a third CC in a third CC list, the second RS comprises all SRS resources that have a same resource identifier as the first SRS resource and that are on all BWPs of at least one CC in the third CC list; or
    in a case that the first RS comprises SRS resources having a same second resource identifier on all BWPs of all CCs in the third CC list, the second RS comprises the SRS resources having the second resource identifier on all the BWPs of all the CCs in the third CC list; or
    in a case that the first RS comprises all SRS resources on all the BWPs of all the CCs in the third CC list, the second RS comprises all the SRS resources on all the BWPs of all the CCs in the third CC list; wherein
    a parameter usage of an SRS resource set to which the first SRS resource belongs is configured to be codebook, nonCodebook, or antennaSwitching.

3. The method according to claim 1, wherein the parameter information further comprises the PL RS, and the preset condition further comprises that no PL RS for a PUCCH or an SRS resource set has been configured; and
    the determining, by a terminal device, parameter information of a second channel or a second RS under a preset condition, based on parameter information of a first channel or a first RS comprises:
    determining, by the terminal device, a PL RS of the second channel or the second RS to be a DL RS out of a plurality of downlink DL RSs that is indicated by using the MAC CE command; wherein
    the first channel comprises a PUCCH, or the first RS comprises an SRS resource set;
    the second channel comprises the PUCCH, or the second RS comprises the SRS resource set; and
    the plurality of DL RSs comprise at least one of the following: a DL RS in spatial relation information of the PUCCH or an SRS resource in the SRS resource set, a DL RS associated with spatial relation information of the PUCCH or an SRS resource in the SRS resource set, and a DL RS in TCI state information of a preset downlink channel; wherein the preset downlink channel is a downlink channel determined according to a preset rule.

4. The method according to claim 1, wherein the second channel is an uplink channel or the second RS is an uplink RS, the parameter information is the spatial relation information, and each CC in the CC list is a CC having an uplink; and
    the CC having an uplink comprises at least one of the following:
    a CC having an uplink slot and/or uplink symbol that is configured by using RRC signaling;
    a CC having an uplink slot and/or uplink symbol that is indicated by downlink control information DCI; and
    a CC that is configured by using RRC signaling to be between a first parameter and a second parameter and that is indicated by DCI to be a CC with an uplink slot and/or uplink symbol, wherein the first parameter comprises a downlink slot and/or a downlink symbol, and the second parameter comprises an uplink slot and/or an uplink symbol.

5. The method according to claim 1, wherein the second channel comprises a first associated channel, or the second RS comprises a first associated RS;
    the preset condition further comprises a multi-TRP scenario, and the MAC CE command carries CORESET information and/or TRP information; and
    the determining, by a terminal device, parameter information of a second channel or a second RS under a preset condition, based on parameter information of a first channel or a first RS comprises:

determining, by the terminal device, parameter information of the first associated channel or the first associated RS as the parameter information of the first channel or the first RS; wherein the first associated channel comprises at least one of the following: a channel corresponding to the CORESET information, a channel corresponding to a TRP that is associated with the CORESET information, and a channel corresponding to a TRP that is corresponding to the TRP information; and the first associated RS comprises at least one of the following: an RS corresponding to the CORESET information, an RS corresponding to a TRP that is associated with the CORESET information, and an RS corresponding to a TRP that is corresponding to the TRP information.

6. The method according to claim 5, wherein the CORESET information and/or TRP information is used to indicate a TRP corresponding to the first channel or the first RS; or the CORESET information and/or TRP information is used to indicate a TRP corresponding to the second channel or the second RS.

7. The method according to claim 5, wherein the first channel and the first associated channel correspond to same CORESET information and/or TRP information; and the first RS and the first associated RS correspond to same CORESET information and/or TRP information.

8. The method according to claim 1, further comprising:
receiving, from the network device, radio resource control RRC signaling;
wherein the RRC signaling is used to configure at least one common CC list for uplink UL and downlink DL.

9. The method according to claim 8, wherein the CCs in the at least one common CC list are located in a same band or different bands.

10. A network device, comprising:
a memory, storing a computer program instruction; and
a processor, wherein when the computer program instruction is executed by the processor, a channel information determining method is implemented, wherein the method comprises:
updating, activating, or indicating, by the network device, parameter information of a first channel or a first reference signal RS by using a media access control control element MAC CE command, wherein the parameter information of the first channel or the first reference signal RS is used for determining the parameter information of a second channel or a second RS under a preset condition; wherein
the parameter information comprises spatial relation information; and
the preset condition comprises that at least one physical uplink control channel PUCCH resource group has been configured on at least one bandwidth part BWP;
wherein the first channel comprises a first PUCCH resource of a first PUCCH resource group on a first BWP, or the first channel comprises all PUCCH resources of the first PUCCH resource group on the first BWP;
PUCCH resources of each PUCCH resource group are located in a same bandwidth part BWP; and
the updating, activating, or indicating parameter information of a first channel or a first reference signal RS by using a media access control MAC control element CE command comprises:

updating, activating, or indicating spatial relation information of the first channel as first spatial relation information by using the MAC CE command.

11. The network device according to claim 10, wherein the first RS comprises a first SRS resource on a fourth BWP of a third CC in a third CC list, or the first RS comprises SRS resources having a same second resource identifier on all BWPs of all CCs in the third CC list, or the first RS comprises all SRS resources on all the BWPs of all the CCs in the third CC list;
the parameter information comprises the spatial relation information, the preset condition further comprises that a plurality of SRS resources have been configured in a multi-CC scenario, and the SRS resources are semi-persistent or aperiodic SRS resources; and
the updating, activating, or indicating parameter information of a first channel or a first RS by using a MAC CE command comprises:
updating, activating, or indicating, by the network device, spatial relation information of the first RS as fourth spatial relation information by using the MAC CE command, wherein
a parameter usage of an SRS resource set to which the first SRS resource belongs is configured to be codebook, noncodebook, or antenna switching.

12. The network device according to claim 10, wherein the first channel comprises a second PUCCH resource on a second BWP of a first CC in a first CC list, or the first channel comprises PUCCH resources having a same first resource identifier on all BWPs of all CCs in the first CC list, or the first channel comprises all PUCCH resources on all the BWPs of all the CCs in the first CC list;
the parameter information comprises the spatial relation information, and the preset condition further comprises that a plurality of PUCCH resources have been configured in a multi-CC scenario; and
the updating, activating, or indicating parameter information of a first channel or a first RS by using a MAC CE command comprises:
updating, activating, or indicating, by the network device, spatial relation information of the first channel as second spatial relation information by using the MAC CE command.

13. The network device according to claim 10, wherein the first channel comprises all PUCCH resources of a second PUCCH resource group on a third BWP of a second CC in a second CC list, or the first channel comprises all PUCCH resources of PUCCH resource groups having a same first resource group identifier on all BWPs of all CCs in the second CC list; or, the first channel comprises all PUCCH resources of all PUCCH resource groups on all the BWPs of all the CCs in the second CC list;
the parameter information comprises the spatial relation information, and the preset condition further comprises that a plurality of PUCCH resource groups have been configured in a multi-CC scenario; and
the updating, activating, or indicating parameter information of a first channel or a first RS by using a MAC CE command comprises:
updating, activating, or indicating, by the network device, spatial relation information of the first channel as third spatial relation information by using the MAC CE command.

14. The network device according to claim 10, wherein the first channel comprises a physical upstream link control channel PUCCH, and the first RS comprises an SRS resource set;

the parameter information further comprises the PL RS, and the preset condition further comprises that no PL RS for a physical uplink control channel PUCCH or for an SRS resource set has been configured; and the updating, activating, or indicating parameter information of a first channel or a first RS by using a MAC CE command comprises:

indicating, by the network device, one DL RS out of a plurality of downlink DL RSs by using the MAC CE command; wherein the plurality of DL RSs comprise at least one of the following: a DL RS in spatial relation information of the PUCCH or an SRS resource in the SRS resource set, a DL RS associated with spatial relation information of the PUCCH or an SRS resource in the SRS resource set, and a DL RS in TCI state information of a preset downlink channel; wherein the preset downlink channel is a downlink channel determined according to a preset rule.

15. The network device according to claim 10, wherein the preset condition further comprises a multi-TRP scenario; and the MAC CE command carries control resource set CORESET information and/or transmission and reception point TRP information.

16. The network device according to claim 15, wherein the CORESET information and/or TRP information is used to indicate a TRP corresponding to the first channel or the first RS; or the CORESET information and/or TRP information is used to indicate a TRP corresponding to the second channel or the second RS.

17. The network device according to claim 10, when the computer program instruction is executed by the processor, the following step may be further implemented:

Before updating, activating, or indicating parameter information of a first channel or a first reference signal RS by using a media access control MAC control element CE, configuring at least one common component carrier CC list for uplink and downlink by using radio resource control RRC signaling.

18. The network device according to claim 17, wherein the CCs in the at least one common CC list are located in a same band or different band.

19. A terminal device, comprising:

a memory, storing a computer program instruction; and a processor, wherein when the computer program instruction is executed by the processor, a channel information determining method is implemented, wherein the method comprises:

determining, by the terminal device, parameter information of a second channel or a second RS under a preset condition, based on parameter information of a first channel or a first RS, wherein the parameter information of the first channel or the first RS is updated, activated, or indicated by a network device by using a MAC CE command; wherein the parameter information comprises spatial relation information; and the preset condition comprises that at least one PUCCH resource group has been configured on at least one BWP;

wherein PUCCH resources of each PUCCH resource group are located in a same BWP; and the determining, by a terminal device, parameter information of a second channel or a second RS under a preset condition, based on parameter information of a first channel or a first RS comprises:

if spatial relation information of the first channel that is updated, activated, or indicated by using the MAC CE command is first spatial relation information, determining, by the terminal device, that spatial relation information of the second channel is the first spatial relation information, wherein in a case that the first channel comprises a first PUCCH resource of a first PUCCH resource group on a first BWP, or that the first channel comprises all PUCCH resources of the first PUCCH resource group on the first BWP, the second channel comprises all the PUCCH resources of the first PUCCH resource group.

* * * * *